US012118950B2

(12) United States Patent
Pyun et al.

(10) Patent No.: US 12,118,950 B2
(45) **Date of Patent: *Oct. 15, 2024**

(54) DISPLAY DEVICE, AND METHOD OF OPERATING A DISPLAY DEVICE

(71) Applicant: Samsung Display Co., Ltd., Yongin-Si (KR)

(72) Inventors: Kihyun Pyun, Gwangmyeong-si (KR); Jang-Hoon Kwak, Cheonan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/498,033

(22) Filed: Oct. 31, 2023

(65) Prior Publication Data

US 2024/0062727 A1 Feb. 22, 2024

Related U.S. Application Data

(63) Continuation of application No. 17/956,942, filed on Sep. 30, 2022, now Pat. No. 11,842,696.

(30) Foreign Application Priority Data

Apr. 1, 2022 (KR) ........................ 10-2022-0041158

(51) Int. Cl.
*G09G 3/3291* (2016.01)
*G09G 3/20* (2006.01)
*G09G 3/3233* (2016.01)

(52) U.S. Cl.
CPC ... *G09G 3/3291* (2013.01); *G09G 2300/0842* (2013.01); *G09G 2320/0233* (2013.01); *G09G 2320/0271* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 6,979,583 | B2 | 12/2005 | Bae et al. | |
| 7,094,122 | B2 | 8/2006 | Toguchi et al. | |
| 10,878,747 | B1 * | 12/2020 | Gao | G09G 3/3233 |
| 11,127,345 | B1 * | 9/2021 | Seo | G09G 3/2003 |
| 2016/0307490 | A1 * | 10/2016 | Lee | G09G 3/3225 |
| 2017/0162098 | A1 * | 6/2017 | Cheon | G09G 3/3225 |
| 2019/0139490 | A1 * | 5/2019 | Bang | G09G 3/2007 |
| 2020/0365091 | A1 * | 11/2020 | Pyun | G09G 3/3283 |
| 2021/0295767 | A1 * | 9/2021 | Seo | G09G 3/2003 |
| 2022/0148501 | A1 * | 5/2022 | Pyun | G09G 3/3233 |
| 2023/0040791 | A1 * | 2/2023 | Lim | G09G 3/3266 |

FOREIGN PATENT DOCUMENTS

| | | | |
|---|---|---|---|
| KR | 10-0316271 | B1 | 12/2001 |
| KR | 10-0495703 | B1 | 6/2005 |
| KR | 10-0747683 | B1 | 8/2007 |

* cited by examiner

*Primary Examiner* — Sepehr Azari
(74) *Attorney, Agent, or Firm* — Innovation Counsel LLP

(57) ABSTRACT

A display device includes a display panel including a plurality of pixels, a current sensor connected to the display panel, a controller including a gray-data voltage storing block, a block load gain extracting block, a block load generating block, a final load generating block, a current control block and a data correction block, and a data driver providing data voltages to the plurality of pixels based on the output image data.

20 Claims, 19 Drawing Sheets

FIG. 8B
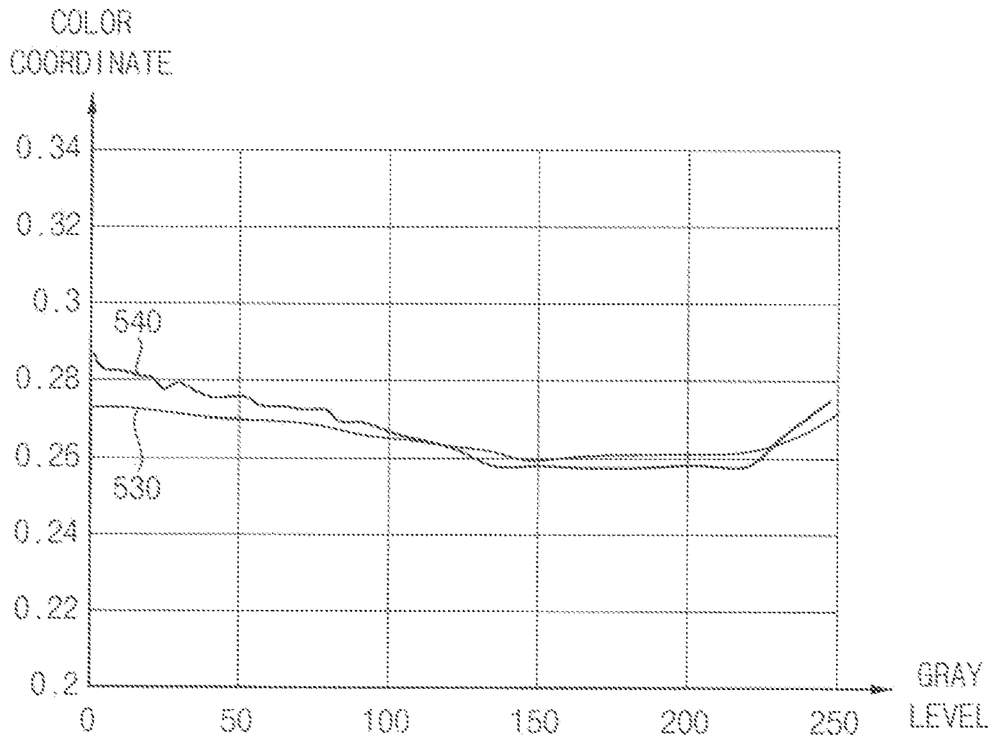
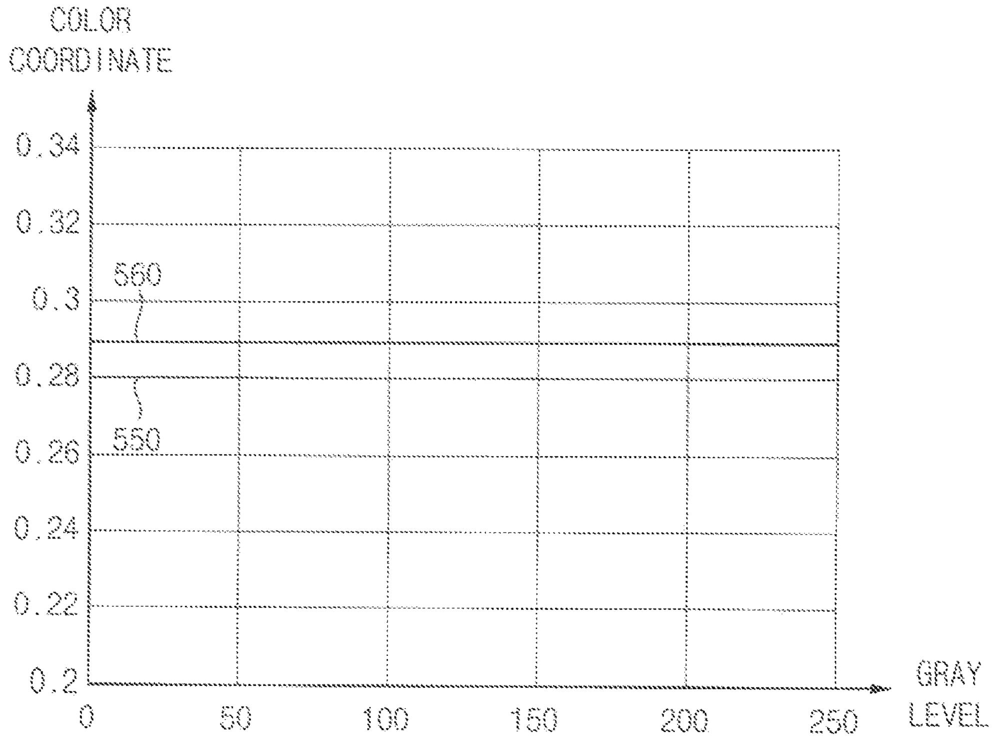

FIG. 8C

GDVI for PB11

| GRAY LEVEL | DATA VOLTAGE VALUE |
|---|---|
| 1G | DV1_PB11 |
| 2G | DV2_PB11 |
| ... | ... |
| 255G | DV255_PB11 |

⋮

GDVI for PBNM

| GRAY LEVEL | DATA VOLTAGE VALUE |
|---|---|
| 1G | DV1_PBNM |
| 2G | DV2_PBNM |
| ... | ... |
| 255G | DV255_PBNM |

FIG. 9B
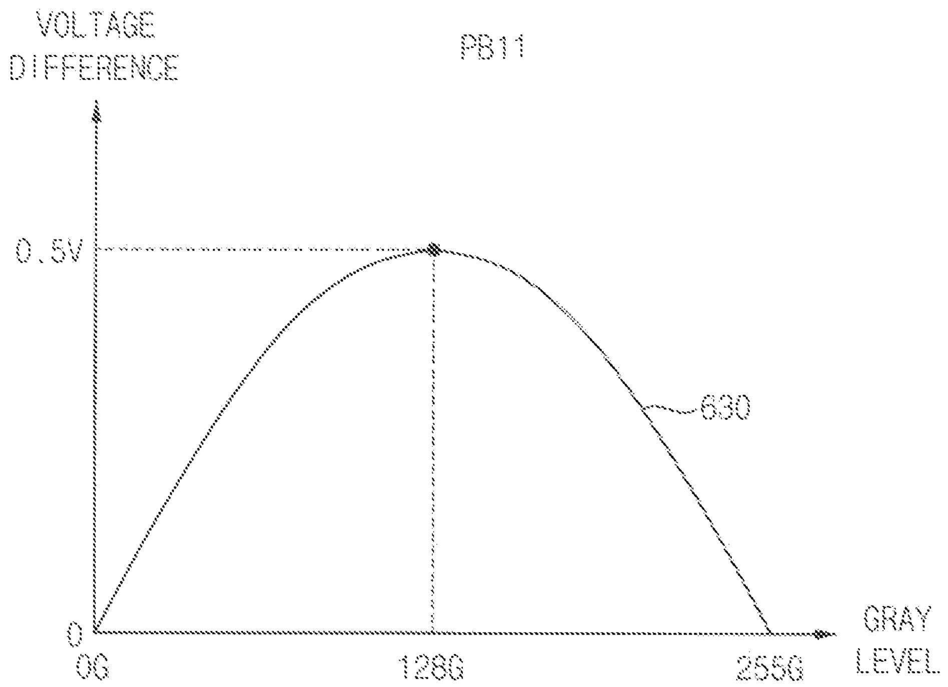
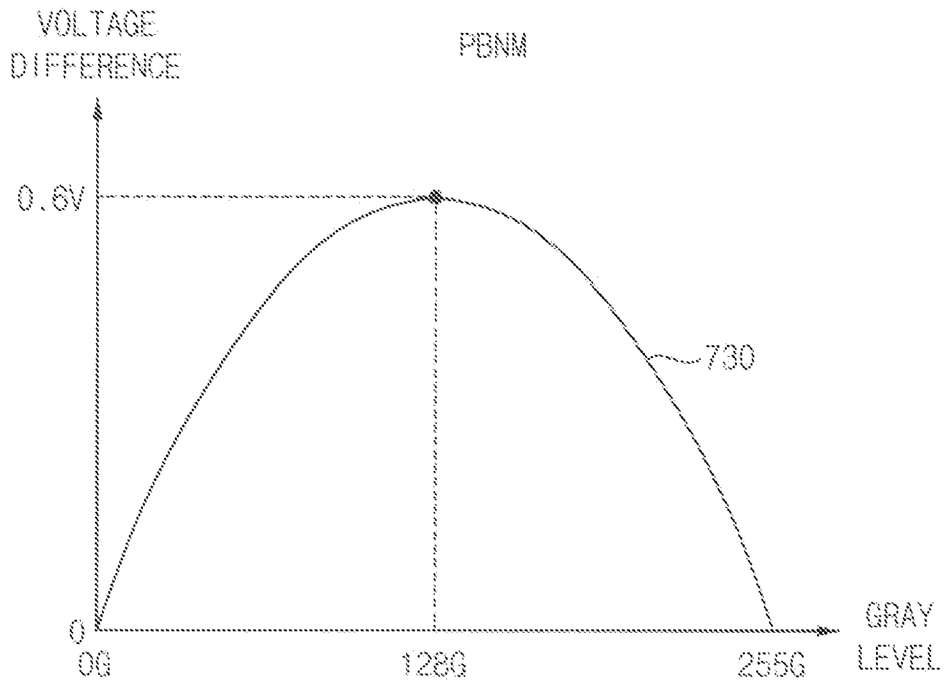

FIG. 9C
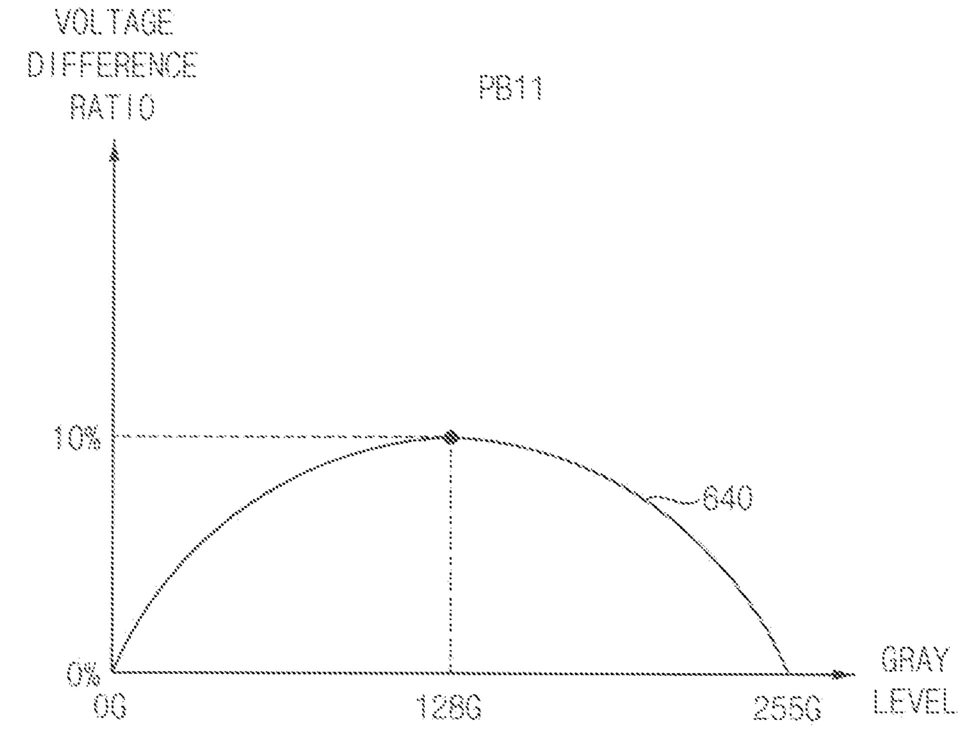
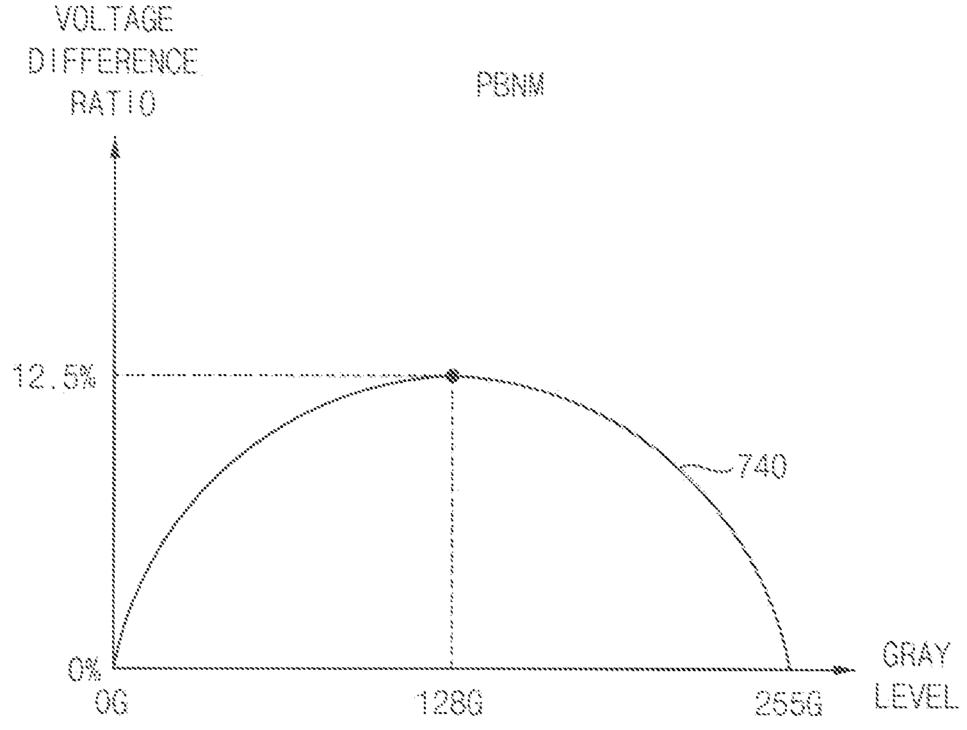

FIG. 9D
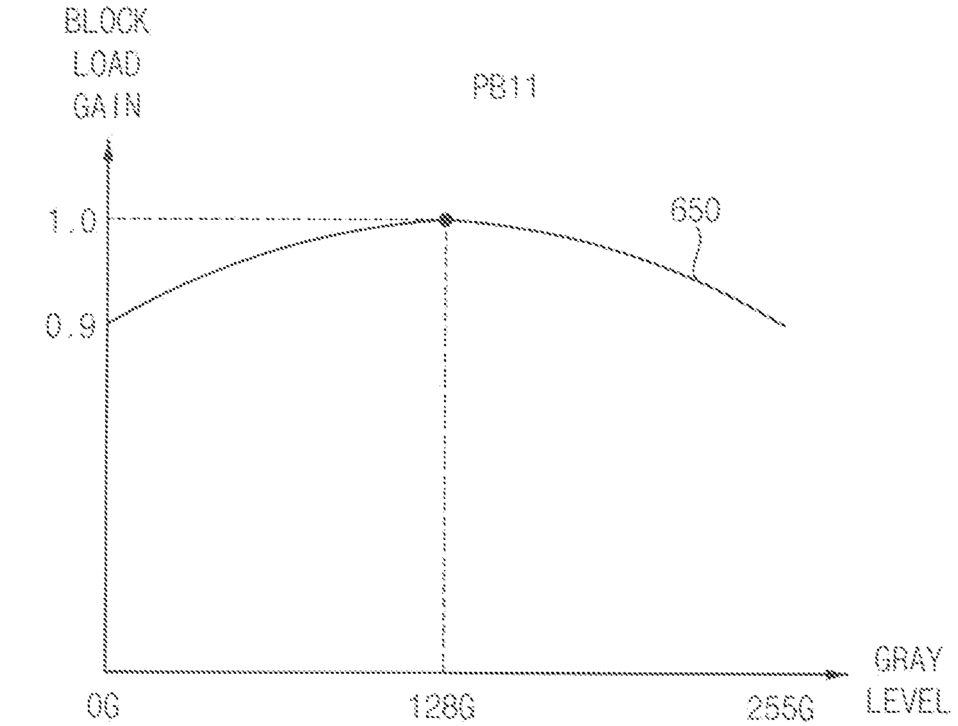
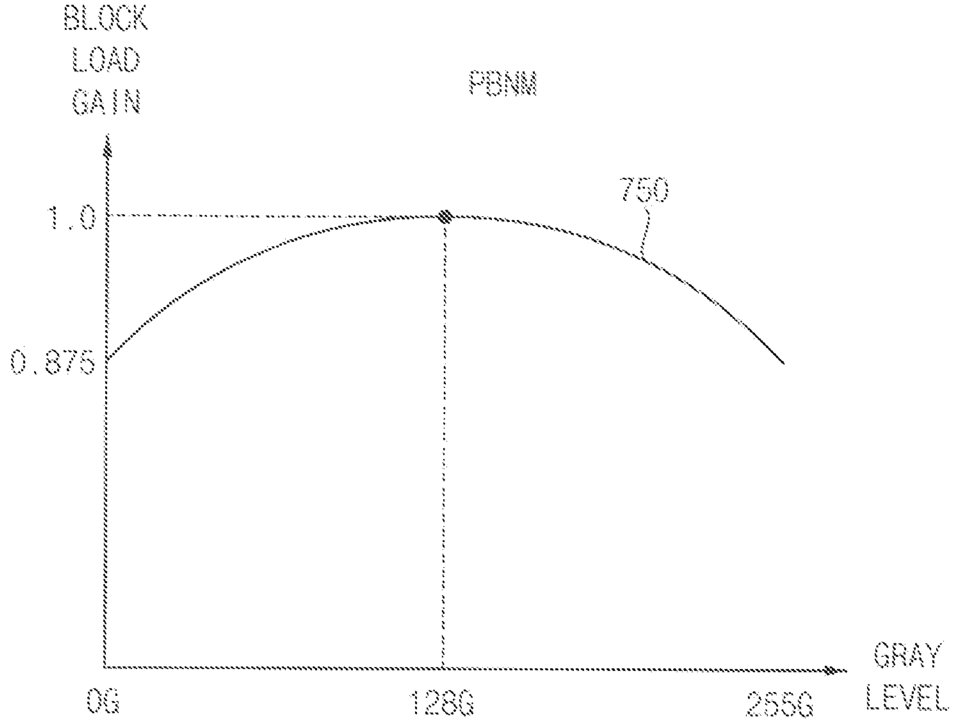

| LOAD VALUE | TARGET CURRENT VALUE |
|---|---|
| 0% | TCUR0 |
| 1% | TCUR1 |
| ... | ... |
| 100% | TCUR100 |

FIG. 14

R_GDVI, G_GDVI & B_GDVI for PB11

| GRAY LEVEL | RED SUB-PIXEL DATA VOLTAGE VALUE | GREEN SUB-PIXEL DATA VOLTAGE VALUE | BLUE SUB-PIXEL DATA VOLTAGE VALUE |
|---|---|---|---|
| 1G | R_DV1_PB11 | G_DV1_PB11 | B_DV1_PB11 |
| 2G | R_DV2_PB11 | G_DV2_PB11 | B_DV2_PB11 |
| ... | ... | ... | ... |
| 255G | R_DV255_PB11 | G_DV255_PB11 | B_DV255_PB11 |

⋮

R_GDVI, G_GDVI & B_GDVI for PBNM

| GRAY LEVEL | RED SUB-PIXEL DATA VOLTAGE VALUE | GREEN SUB-PIXEL DATA VOLTAGE VALUE | BLUE SUB-PIXEL DATA VOLTAGE VALUE |
|---|---|---|---|
| 1G | R_DV1_PBNM | G_DV1_PBNM | B_DV1_PBNM |
| 2G | R_DV2_PBNM | G_DV2_PBNM | B_DV2_PBNM |
| ... | ... | ... | ... |
| 255G | R_DV255_PBNM | G_DV255_PBNM | B_DV255_PBNM |

DISPLAY DEVICE, AND METHOD OF OPERATING A DISPLAY DEVICE

CROSS-REFERENCE TO RELATED APPLICATION(S)

This application is a continuation application of U.S. patent application Ser. No. 17/956,942, filed on Sep. 30, 2022, which claims priority under 35 USC § 119 to Korean Patent Application No. 10-2022-0041158, filed on Apr. 1, 2022, in the Korean Intellectual Property Office (KIPO), the content of which is herein incorporated by reference in its entirety.

BACKGROUND

1. Field

Embodiments of the present inventive concept relate to a display device, and more particularly to a display device that controls a current of a display panel, and a method of operating the display device.

2. Description of the Related Art

In a display device, such as an organic light emitting diode (OLED) display device, a current of a display panel may be controlled according to a load of input image data. By this current control for the display panel, the display panel may emit light with desired luminance. Further, by the current control for the display panel, the display panel may be prevented from emitting light with excessively high luminance, and thus power consumption may be reduced.

However, light emission efficiency (or current efficiency) of a light emitting element, such as an OLED, may be changed according to a gray level or a data voltage. Thus, in a case where first and second image data having the same load have different gray level distributions, a current required for driving a display panel based on the first image data and a current required for driving the display panel based on the second image data may be different from each other. However, in a conventional display device, a current of a display panel may be controlled to the same current in both cases where the display panel is driven based on the first image data or based on the second image data, and thus the display panel may not emit light with desired luminance.

SUMMARY

Some embodiments provide a display device that controls a current of a display panel by considering light emission efficiency according to a gray level and a position.

Some embodiments provide a method of operating a display device that controls a current of a display panel by considering light emission efficiency according to a gray level and a position.

According to embodiments, there is provided a display device including a display panel including a plurality of pixels, the plurality of pixels including a plurality of pixel blocks, a current sensor connected to the display panel, a controller, the controller including a gray-data voltage storing block storing gray-data voltage information for each of the plurality of pixel blocks, a block load gain extracting block generating gray-block load gain information for each of the plurality of pixel blocks based on the gray-data voltage information, a block load generating block generating a block representative gray level and a block load for each of the plurality of pixel blocks by analyzing input image data, a final load generating block generating a final load for the display panel based on the gray-block load gain information, the block representative gray level and the block load, a current control block determining a scale factor based on the final load and a sensing current value from the current sensor, and a data correction block generating output image data by applying the scale factor to the input image data, and a data driver providing data voltages to the plurality of pixels based on the output image data.

In embodiments, the gray-data voltage information may represent a plurality of data voltage values respectively corresponding to a plurality of gray levels with respect to each of the plurality of pixel blocks, and the gray-block load gain information may represent a plurality of block load gains respectively corresponding to the plurality of gray levels with respect to each of the plurality of pixel blocks.

In embodiments, the gray-data voltage information may be generated by a luminance and color correction operation for the display device.

In embodiments, the display device may further includes a target current determining block determining a target current value corresponding to the final load. The block load gain extracting block may be connected to the gray-data voltage storing block, the block load generating block may receive the input image data, the final load generating block may be connected to the block load gain extracting block and the block load generating block, and determine a block load gain for each of the plurality of pixel blocks based on the gray-block load gain information and the block representative gray level for each of the plurality of pixel blocks, and generate the final load for the display panel based on the block loads and the block load gains of the plurality of pixel blocks, the target current determining block may be connected to the final load generating block, the current control block may be connected to the current sensor and the target current determining block, and receive the sensing current value from the current sensor, and determine the scale factor by comparing the sensing current value with the target current value, and the data correction block may be connected to the current control block.

In embodiments, with respect to the each of the plurality of pixel blocks, the block load gain extracting block may determine a reference gray-data voltage line connecting a minimum coordinate and a maximum coordinate of an actual gray-data voltage curve represented by the gray-data voltage information, may generate a gray-voltage difference curve corresponding to a difference between the reference gray-data voltage line and the actual gray-data voltage curve, may generate a gray-voltage difference ratio curve by dividing a voltage difference at each gray level represented by the gray-voltage difference curve by a data voltage value at each gray level represented by the reference gray-data voltage line, and may generate the gray-block load gain information representing a plurality of block load gains respectively corresponding to a plurality of gray levels by normalizing the gray-voltage difference ratio curve.

In embodiments, with respect to the each of the plurality of pixel blocks, the block load generating block may generate an average of gray levels represented by the input image data as the block representative gray level, and may generate the block load by dividing a sum value of the gray levels represented by the input image data by a maximum sum value.

In embodiments, the final load generating block may determine the block load gain corresponding to the block representative gray level by using the gray-block load gain information representing a plurality of block load gains respectively corresponding to a plurality of gray levels with respect to the each of the plurality of pixel blocks, may generate a final block load by multiplying the block load and the block load gain with respect to the each of the plurality of pixel blocks, and may generating an average of the final block loads of the plurality of pixel blocks as the final load for the display panel.

In embodiments, the target current determining block may include a load-target current lookup table configured to store a plurality of target current values respectively corresponding to a plurality of load values, and may determine the target current value corresponding to the final load by using the load-target current lookup table.

In embodiments, the current control block may generate the scale factor greater than 1 when the sensing current value is less than the target current value, and may generate the scale factor less than 1 when the sensing current value is greater than the target current value.

In embodiments, the data correction block may generate the output image data by multiplying the input image data by the scale factor.

In embodiments, each of the plurality of pixels may include a first sub-pixel emitting first color light, a second sub-pixel emitting second color light, and a third sub-pixel emitting third color light. The controller may store, as the gray-data voltage information, first, second and third color gray-data voltage information for the first, second and third sub-pixels with respect to the each of the plurality of pixel blocks, may generate, as the gray-block load gain information, first, second and third color gray-block load gain information based on the first, second and third color gray-data voltage information with respect to the each of the plurality of pixel blocks, may generate first, second and third color block representative gray levels and first, second and third color block loads by analyzing the input image data with respect to the each of the plurality of pixel blocks, and may generate the final load for the display panel based on the first, second and third color gray-block load gain information, the first, second and third color block representative gray levels and the first, second and third color block loads.

In embodiments, the display device may further include a target current determining block determining a target current value corresponding to the final load. The block load gain extracting block may be connected to the gray data voltage storing block and the gray-block load gain information may include the first, second and third color gray-block load gain information for the each of the plurality of pixel blocks based on the first, second and third color gray-data voltage information, the block load generating block may receive the input image data and generates the first, second and third color block representative gray levels and the first, second and third color block loads for the each of the plurality of pixel blocks by analyzing the input image data, the final load generating block may be connected to the block load gain extracting block and the block load generating block, and determine first, second and third color block load gains for the each of the plurality of pixel blocks based on the first, second and third color gray-block load gain information and the first, second and third color block representative gray levels for the each of the plurality of pixel blocks, and generate the final load for the display panel based on the first, second and third color block loads and the first, second and third color block load gains of the plurality of pixel blocks, the target current determining block may be connected to the final load generating block, the current control block may be connected to the current sensor and the target current determining block, and receive configured to receive the sensing current value from the current sensor, and determine the scale factor by comparing the sensing current value with the target current value, and the data correction block may be connected to the current control block.

According to embodiments, there is provided a method of operating a display device. In the method, gray-data voltage information for each of a plurality of pixel blocks of a display panel of the display device is stored, gray-block load gain information for each of the plurality of pixel blocks is generated based on the gray-data voltage information, a sensing current value is generated by sensing a current flowing through the display panel, a block representative gray level and a block load for each of the plurality of pixel blocks are generated by analyzing input image data, a final load for the display panel is generated based on the gray-block load gain information, the block representative gray level and the block load, a scale factor is determined based on the final load and the sensing current value, output image data are generated by applying the scale factor to the input image data, and the display panel is driven based on the output image data.

In embodiments, the gray-data voltage information may represent a plurality of data voltage values respectively corresponding to a plurality of gray levels with respect to the each of the plurality of pixel blocks, and the gray-block load gain information may represent a plurality of block load gains respectively corresponding to the plurality of gray levels with respect to the each of the plurality of pixel blocks.

In embodiments, the gray-data voltage information may be generated by a luminance and color correction operation for the display device.

In embodiments, to generate the gray-block load gain information for the each of the plurality of pixel blocks, a reference gray-data voltage line connecting a minimum coordinate and a maximum coordinate of an actual gray-data voltage curve represented by the gray-data voltage information may be determined, a gray-voltage difference curve corresponding to a difference between the reference gray-data voltage line and the actual gray-data voltage curve may be generated, a gray-voltage difference ratio curve may be generated by dividing a voltage difference at each gray level represented by the gray-voltage difference curve by a data voltage value at each gray level represented by the reference gray-data voltage line, and the gray-block load gain information representing a plurality of block load gains respectively corresponding to a plurality of gray levels may be generated by normalizing the gray-voltage difference ratio curve.

In embodiments, to generate the block representative gray level and the block load for the each of the plurality of pixel blocks, the block representative gray level may be generated by generating an average of gray levels represented by the input image data with respect to each of the plurality of pixel blocks, and the block load may be generated by dividing a sum value of the gray levels represented by the input image data by a maximum sum value with respect to each of the plurality of pixel blocks.

In embodiments, to generate the final load for the display panel, a block load gain corresponding to the block representative gray level may be determined by using the gray-block load gain information representing a plurality of block load gains respectively corresponding to a plurality of gray levels with respect to the each of the plurality of pixel blocks, and a final block load may be generated by multiplying the block load and the block load gain with respect to the each of the plurality of pixel blocks, and the final load for the display panel may be generated by generating an average of the final block loads of the plurality of pixel blocks.

In embodiments, to determine the scale factor, a target current value corresponding to the final load may be determined by using a load-target current lookup table storing a plurality of target current values respectively corresponding to a plurality of load values, and the scale factor may be determined by comparing the sensing current value with the target current value.

In embodiments, each pixel of the display panel may include a first sub-pixel emitting first color light, a second sub-pixel emitting second color light, and a third sub-pixel emitting third color light. First, second and third color gray-data voltage information for the first, second and third sub-pixels may be stored with respect to the each of the plurality of pixel blocks, first, second and third color gray-block load gain information may be generated based on the first, second and third color gray-data voltage information with respect to the each of the plurality of pixel blocks, first, second and third color block representative gray levels and first, second and third color block loads may be generated by analyzing the input image data with respect to the each of the plurality of pixel blocks, and the final load for the display panel may be generated based on the first, second and third color gray-block load gain information, the first, second and third color block representative gray levels and the first, second and third color block loads.

As described above, in a display device and a method of operating the display device according to embodiments, gray-data voltage information for each of a plurality of pixel blocks may be stored, gray-block load gain information for each of the plurality of pixel blocks may be generated based on the gray-data voltage information, and a final load for a display panel may be determined by using the gray-block load gain information for each of the plurality of pixel blocks. Accordingly, light emission efficiency (or current efficiency) according to each pixel block (or each position) and each gray level may be considered in determining the final load, and thus the display panel may emit light with desired luminance while a current of the display panel may be controlled to reduce power consumption.

BRIEF DESCRIPTION OF THE DRAWINGS

Illustrative, non-limiting embodiments will be more clearly understood from the following detailed description in conjunction with the accompanying drawings.

FIG. 8B is a diagram for describing an example of a color correction operation, and FIG. 8C is a diagram illustrating an example of gray-data voltage information for a plurality of pixel blocks.

FIG. 9B is a diagram illustrating examples of gray-voltage difference curves with respect to first and second pixel blocks, FIG. 9C is a diagram illustrating examples of gray-voltage difference ratio curves with respect to first and second pixel blocks, and FIG. 9D is a diagram illustrating examples of gray-block load gain curves with respect to first and second pixel blocks.

FIG. 14 is a diagram illustrating an example of red, green and blue gray-data voltage information for a plurality of pixel blocks.

DETAILED DESCRIPTION OF THE EMBODIMENTS

Hereinafter, embodiments of the present inventive concept will be explained in detail with reference to the accompanying drawings.

Figure 1:
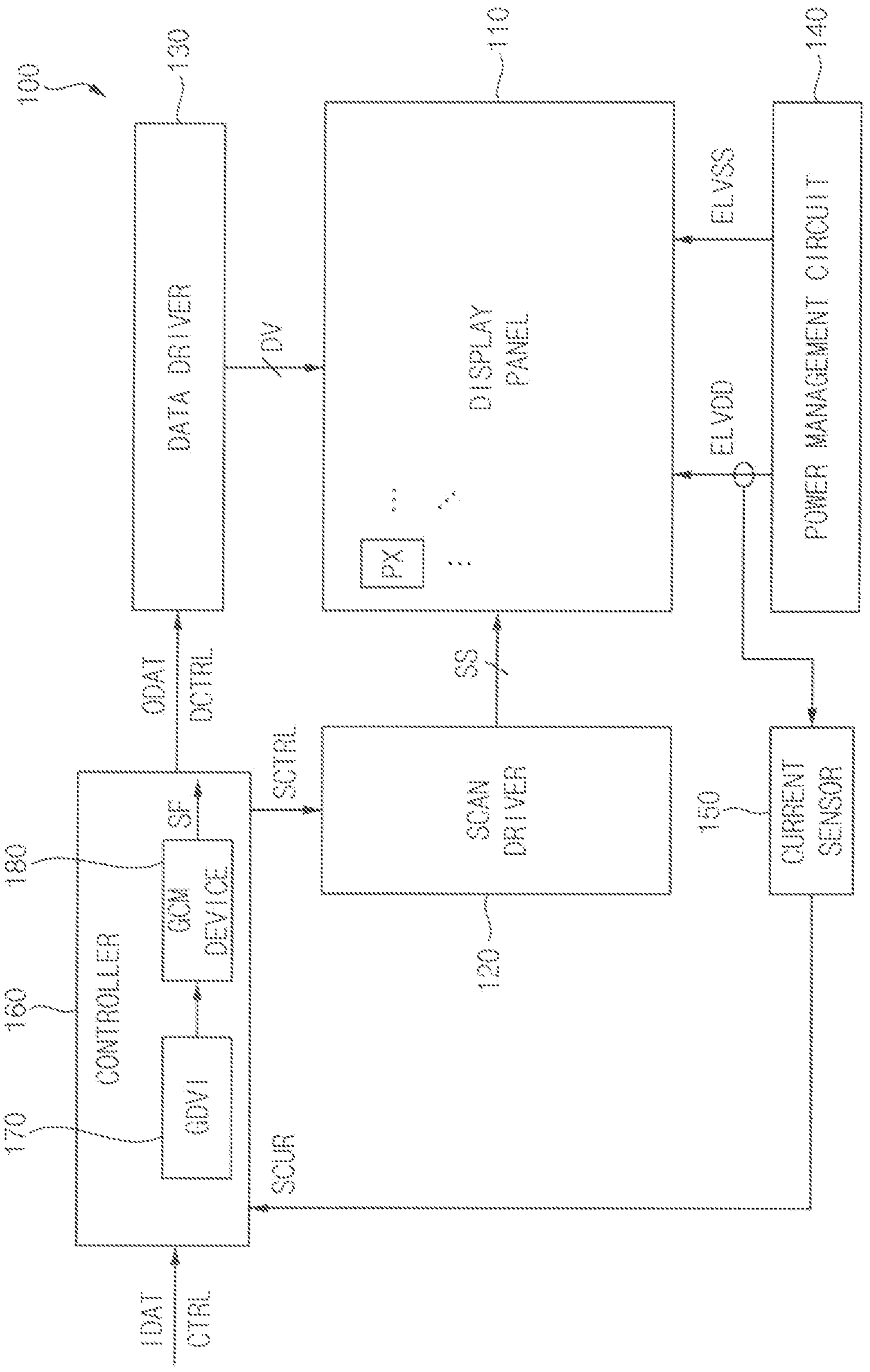
FIG. 1 is a block diagram illustrating a display device according to embodiments.
Figure 2:
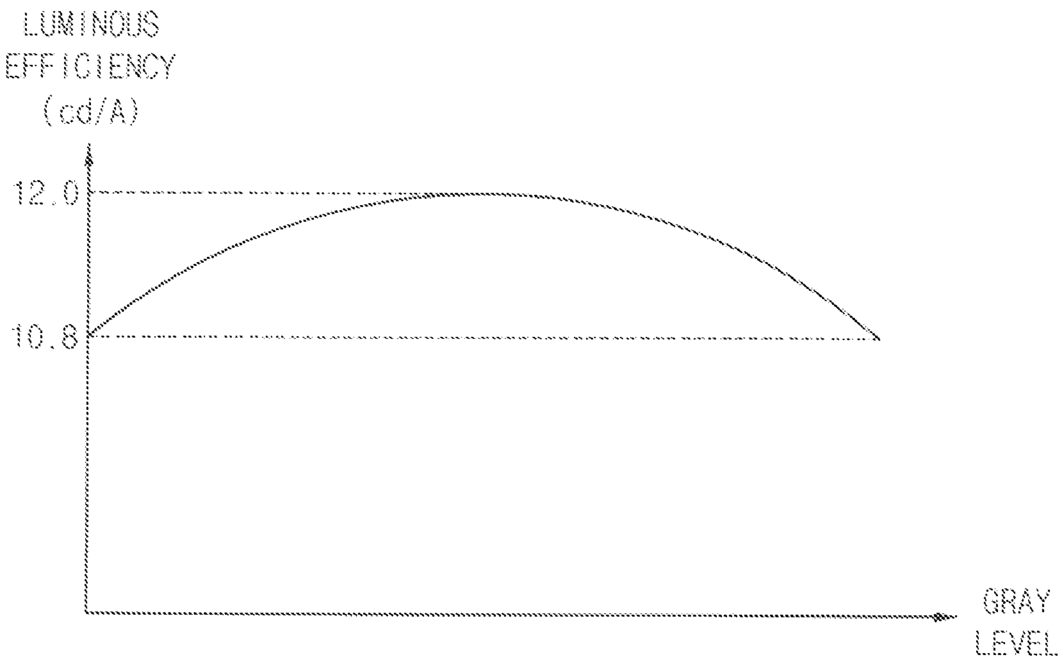
FIG. 2 is a diagram illustrating an example of light emission efficiency according to a gray level.
Figure 3:
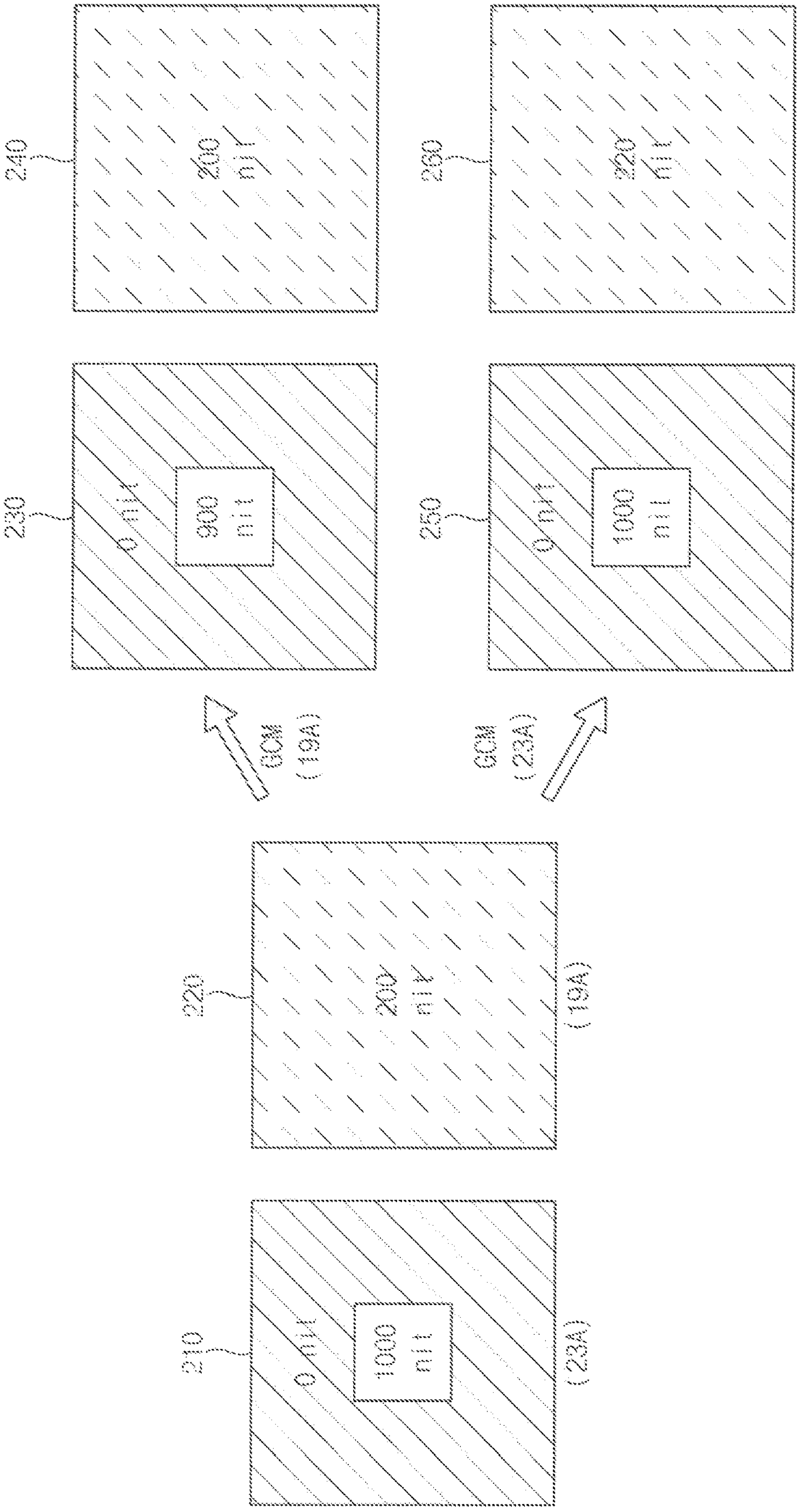
FIG. 3 is a diagram for describing examples of current control for a display panel in a conventional display device.
Figure 4:
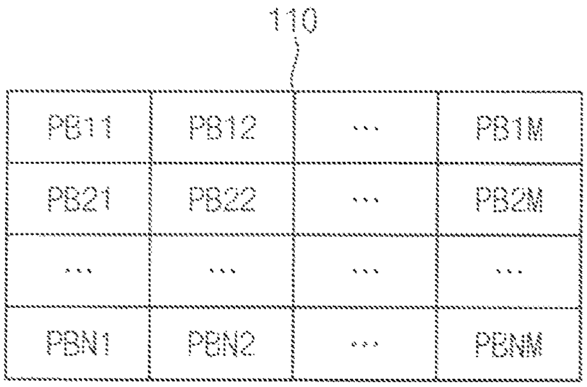
FIG. 4 is a diagram illustrating an example where a display panel is divided into a plurality of pixel blocks.
Figure 5:
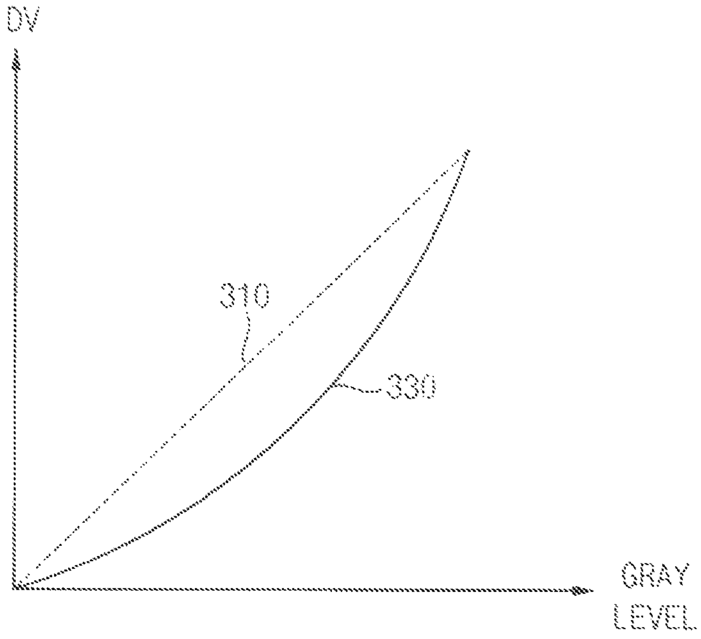
FIG. 5 is a diagram illustrating an example of an ideal data voltage line and an actual data voltage curve according to a gray level.
Figure 6:
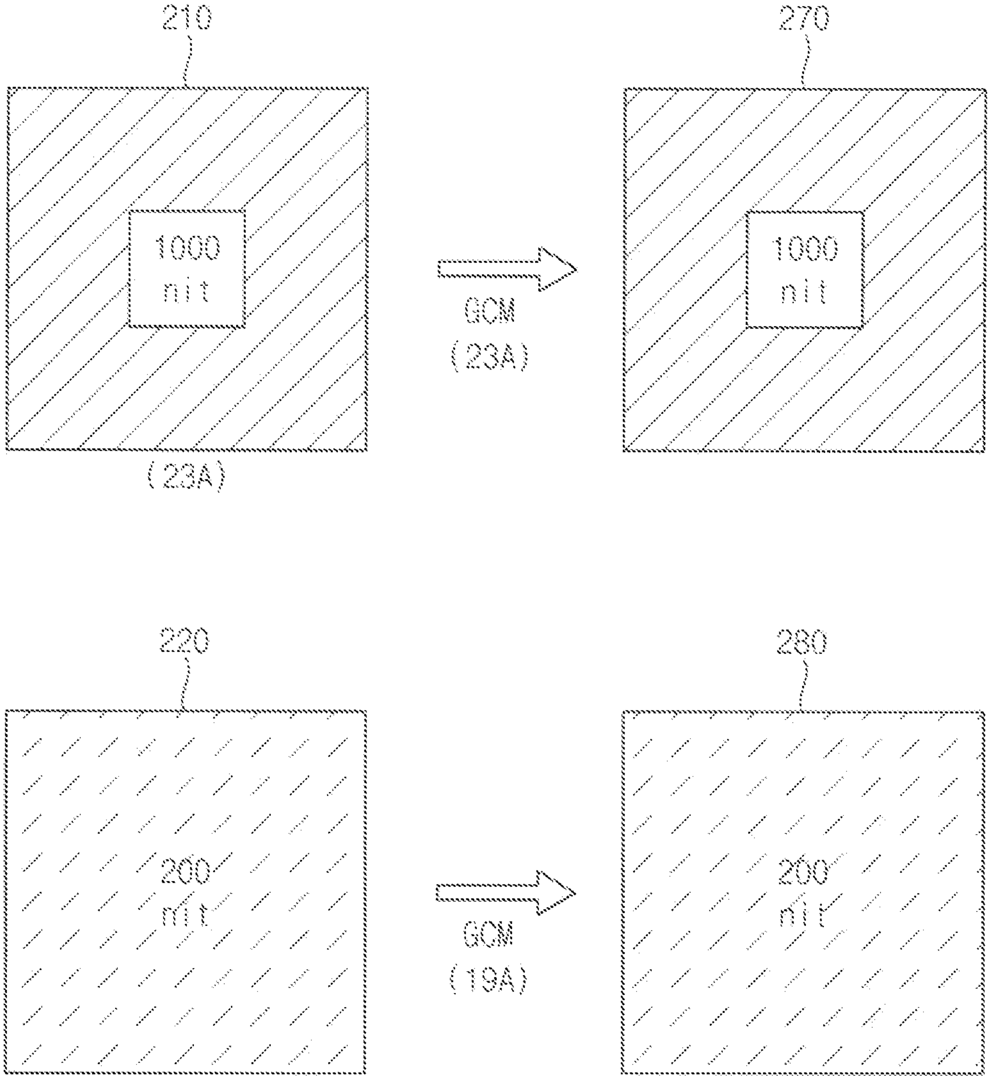
FIG. 6 is a diagram for describing examples of current control for a display panel in a display device according to embodiments.

FIG. 1 is a block diagram illustrating a display device according to embodiments, FIG. 2 is a diagram illustrating an example of light emission efficiency according to a gray level, FIG. 3 is a diagram for describing examples of current control for a display panel in a conventional display device, FIG. 4 is a diagram illustrating an example where a display panel is divided into a plurality of pixel blocks, FIG. 5 is a diagram illustrating an example of an ideal data voltage line and an actual data voltage curve according to a gray level, and FIG. 6 is a diagram for describing examples of current control for a display panel in a display device according to embodiments.

Referring to FIG. 1, a display device 100 according to embodiments may include a display panel 110 that includes a plurality of pixels PX, a scan driver 120 that provides scan signals SS to the plurality of pixels PX, a data driver 130 that provides data voltages DV to the plurality of pixels PX, a power management circuit 140 that supplies power to the display device 100, and a controller 160 that controls an operation of the display device 100.

The display panel 110 may include a plurality of data lines, a plurality of scan lines, and the plurality of pixels PX coupled to the plurality of data lines and the plurality of scan lines. In some embodiments, each pixel PX may include at least two transistors, at least one capacitor and alight emitting element, and the display panel 110 may be a light emitting display panel. For example, the light emitting element may be an organic light emitting diode (OLED), and the display panel 110 may be an OLED display panel. In other examples, the light emitting element may be a nano light emitting diode (NED), a quantum dot (QD) light emitting diode, a micro light emitting diode, an inorganic light emitting diode, or any other suitable light emitting element. However, the display panel 110 is not limited to the light emitting display panel, and may be any suitable display panel.

The scan driver 120 may generate the scan signals SS based on a scan control signal SCTRL received from the controller 160, and may sequentially provide the scan signals SS to the plurality of pixels PX on a row-by-row basis through the scan lines. In some embodiments, the scan control signal SCTRL may include, but not limited to, a scan start signal and a scan clock signal. In some embodiments, the scan driver 120 may be integrated or formed in the display panel 110. In other embodiments, the scan driver 120 may be implemented with one or more integrated circuits.

The data driver 130 may generate the data voltage DV based on output image data ODAT and a data control signal DCTRL received from the controller 160, and may provide the data voltages DV to the plurality of pixels PX through the data lines. In some embodiments, the data control signal DCTRL may include, but not limited to, an output data enable signal, a horizontal start signal and a load signal. In some embodiments, the data driver 130 may be implemented with one or more integrated circuits. In other embodiments, the data driver 130 and the controller 160 may be implemented with a single integrated circuit, and the single integrated circuit may be referred to as a timing controller embedded data driver (TED).

The power management circuit 140 may provide a first power supply voltage ELVDD (e.g., a high power supply voltage) and a second power supply voltage ELVSS (e.g., a low power supply voltage) to the display panel 110. In some embodiments, the power management circuit 140 may further provide voltages required for an operation of the display device 100. For example, the power management circuit 140 may provide power supply voltages and/or driving voltages to the scan driver 120, the data driver 130, the current sensor 150 and the controller 160. In some embodiments, the power management circuit 140 may be implemented as a separate integrated circuit, and the integrated circuit may be referred to as a power management integrated circuit (PMIC). In other embodiments, the power management circuit 140 may be included in the controller 160.

The current sensor 150 may generate a sensing current value SCUR by sensing a current flowing through the display panel 110, and may provide the sensing current value SCUR to the controller 160. In some embodiments, as illustrated in FIG. 1, the current sensor 150 may sense a current provided to the display panel 110 through a power supply line for supplying the first power supply voltage ELVDD. In other embodiments, the current sensor 150 may sense a current of a power supply line for supplying the second power supply voltage ELVSS. In some embodiments, the current sensor 150 may be included in the power management circuit 140. In other embodiments, the current sensor 150 may be located outside the power management circuit 140.

The controller 160 (e.g., a timing controller (TCON)) may receive input image data IDAT and a control signal CTRL from an external host processor (e.g., an application processor (AP), a graphics processing unit (GPU) or a graphics card). In some embodiments, the control signal CTRL may include, but not limited to, a vertical synchronization signal, a horizontal synchronization signal, an input data enable signal, a master clock signal, or the like. The controller 160 may generate the data control signal DCTRL, the scan control signal SCTRL and the output image data ODAT based on the control signal CTRL and the input image data IDAT. The controller 160 may control an operation of the data driver 130 by providing the data control signal DCTRL and the output image data ODAT to the data driver 130, and may control an operation of the scan driver 120 by providing the scan control signal SCTRL to the scan driver 120.

In the display device 100 according to embodiments, the controller 160 may include a global current management (GCM) device 180 (or a global current modulation device) for current control or luminance control for the display panel 110. The GCM device 180 may generate a load for the display panel 110 corresponding to the input image data IDAT by analyzing the input image data IDAT, and may determine a scale factor SF based on the load and the sensing current value SCUR. The controller 160 may generate the output image data ODAT by applying the scale factor SF to the input image data IDAT, and the data driver 130 may drive the display panel 110 based on the output image data ODAT. Since the display panel 110 is driven based on the output image data ODAT where the scale factor SF is applied, a current of the display panel 110 may be controlled to a desired current.

However, light emission efficiency (or current efficiency) of the light emitting element (e.g., the OLED) of each pixel PX may be changed according to a gray level. The light emission efficiency may be determined by dividing a product of luminance of the light emitting element and an area by a current of the light emitting element. For example, as illustrated in FIG. 2, light emission efficiency of the light emitting element may be about 10.8 cd/A at a maximum gray level and a minimum gray level, and may be about 12 cd/A at a middle gray level. Thus, the light emission efficiency of the light emitting element at the maximum gray level and the minimum gray level may be lower than the light emission efficiency of the light emitting element at the middle gray level. Accordingly, in a case where first and second image data having the same load have different gray level distributions, a current required for driving a display panel based on the first image data and a current required for driving the display panel based on the second image data may be different from each other. However, in a conventional display device that performs global current management, a current of a display panel may be controlled to the same current in both cases where the display panel is driven based on the first image data or based on the second image data, and thus the display panel may not emit light with desired luminance.

For example, as illustrated in FIG. 3, in a case where the first image data has a high gray level area corresponding to about 1000 nit in a central portion a display panel 210, and has a low gray level area corresponding to about 0 nit in a peripheral portion that surround the central portion of the display panel 210, the display panel 210 driven based on the first image data may require a current of about 23 A. Further, in a case where the second image data has a middle gray level corresponding to about 200 nit with respect to the entire region of a display panel 220, the display panel 220 driven based on the second image data may require a current of about 19 A. In the conventional display device that performs the global current management, a current of the display panel 210 driven based on the first image data and a current of the display panel 220 driven based on the second image data may be set to have the same current. In an example, the conventional display device may perform the global current management to the current of about 19 A required by the display panel 220 driven based on the second image data. In this case, the display panel 240 driven based on the second image data may emit light with desired luminance of about 200 nit, but the central portion of the display panel 230 driven based on the first image data may emit light with luminance of about 900 nit lower than desired luminance of about 1000 nit. In another example, the conventional display device may perform the global current management to the current of about 23 A required by the display panel 210 driven based on the first image data. In this case, the central portion of the display panel 250 driven based on the first image data may emit light with desired luminance of about 1000 nit, but the display panel 260 driven based on the second image data may emit light with luminance of about 220 nit higher than desired luminance of about 200 nit. As described above, a display panel of the conventional display device may not emit light with desired luminance according to a gray level distribution of image data. Further, the light emission efficiency of the light emitting element may not be constant not only according to a gray level as described above, but also according to a position of the light emitting element due to a process variation or the like. The conventional display device may not consider the light emission efficiency (or a variation of the light emission efficiency) according to the gray level and the position in performing the global current management.

However, the display device 100 according to embodiments may perform the global current management by considering the light emission efficiency (or the variation of the light emission efficiency) according to the gray level and the position. To consider the light emission efficiency according to the gray level and the position, in the display device 100 according to embodiments, the display panel 110 may divided a display area into a plurality of pixel blocks, a gray-data voltage storing block 170 of the controller 160 may store gray-data voltage information GDVI for each of the plurality of pixel blocks, and the GCM device 180 may perform the global current management by using the gray-data voltage information GDVI for each of the plurality of pixel blocks. In some embodiments, the GCM device 180 may generate gray-block load gain information for each of the plurality of pixel blocks based on the gray-data voltage information GDVI, may generate a block representative gray level and a block load for each of the plurality of pixel blocks by analyzing the input image data IDAT, may generate a final load for the display panel 110 based on the gray-block load gain information, the block representative gray level and the block load, and may determine a scale factor SF based on the target current value TCUR that is obtained using the final load and the sensing current value SCUR.

For example, as illustrated in FIG. 4, the controller 160 may divide the display panel 110 into N*M pixel blocks PB11, PB12, . . . , PB1M, PB21, PB22, . . . , PB2M, . . . , PBN1, PBN2, . . . , PBNM, where each of N and M is an integer greater than 0. The GCM device 180 may determine the final load for the display panel 110 based on the gray-block load gain information, the block representative gray level and the block load for each of the N*M pixel blocks PB11 through PBNM, and thus may perform the global current management by considering the light emission efficiency (or the variation of the light emission efficiency) according to each pixel block or according to the position.

Further, with respect to each pixel block, the gray-data voltage information GDVI may represent a plurality of data voltage values to which the light emission efficiency (or the variation of the light emission efficiency) according to the gray level is reflected at a plurality of gray levels (e.g., 255 gray levels). For example, as illustrated in FIG. 5, in a case where the light emission efficiency is not changed according to the gray level, or in an ideal case where the light emission efficiency of the light emitting element is constant according to the gray level, the data voltage DV may be linearly proportional to the gray level as illustrated as an ideal gray-data voltage line 310. However, in a real case where the light emission efficiency of the light emitting element is not constant according to the gray level as illustrated in FIG. 2, for the light emitting element to emit light with desired luminance according to the gray level, the data voltage DV may be set as an actual gray-data voltage curve 330 by considering the light emission efficiency according to the gray level (e.g., by a luminance and color correction operation illustrated in FIGS. 8A and 8B). The gray-data voltage information GDVI may represent the actual gray-data voltage curve 330 to which the light emission efficiency according to the gray level is reflected, or a plurality of actual data voltage values to which the light emission efficiency according to the gray level is reflected at the plurality of gray levels. With respect to each of the plurality of pixel blocks, the GCM device 180 may generate the gray-block load gain information representing a plurality of block load gains respectively corresponding to the plurality of gray levels based on a difference between the ideal gray-data voltage line 310 and the actual gray-data voltage curve 330 represented by the gray-data voltage information GDVI, and may determine a block load gain at the block representative gray level by using the gray-block load gain information. This block load gain may be proportional to the light emission efficiency of the light emitting element. For example, the block load gain may be relatively high at a first block representative gray level at which the light emission efficiency is relatively high, and may be relatively low at a second block representative gray level at which the light emission efficiency is relatively low. Further, the GCM device 180 may determine the final load and the scale factor SF by reflecting the block load gain of each pixel block. Thus, the light emission efficiency (or the variation of the light emission efficiency) according to the gray level in each pixel block may be reflected to the final load and the scale factor SF, and thus the display panel 110 driven based on the output image data ODAT where the scale factor SF is applied may emit light with desired luminance.

For example, as illustrated in FIG. 6, in a case where the input image data IDAT are the first image data representing the high gray level corresponding to about 1000 nit with respect to the central portion of the display panel 210, the display device 100 may determine the scale factor SF suitable for the first image data by considering the light emission efficiency according to the gray level and the position, and may generate the output image data ODAT by applying the scale factor SF to the input image data IDAT. Thus, the display panel 270 may emit light with desired luminance of about 1000 nit at the central portion. Further, in a case where the input image data IDAT are the second image data representing the middle gray level corresponding to about 200 nit with respect to the entire region of the display panel 220, the display device 100 may determine the scale factor SF suitable for the second image data by considering the light emission efficiency according to the gray level and the position, and may generate the output image data ODAT by applying the scale factor SF to the input image data IDAT. Thus, the display panel 280 may emit light with desired luminance of about 200 nit at the entire region. That is, in the display device 100 according to embodiments, even if the first and second image data have the same load, the light emission efficiency corresponding to each pixel block (or each position) and the gray level is reflected in determining the final load, and thus the scale factor SF for the first and second image data may be different from each other. Accordingly, while the current of the display panel may be controlled to reduce power consumption, the display panel 110 may emit light with desired luminance.

Figure 7:
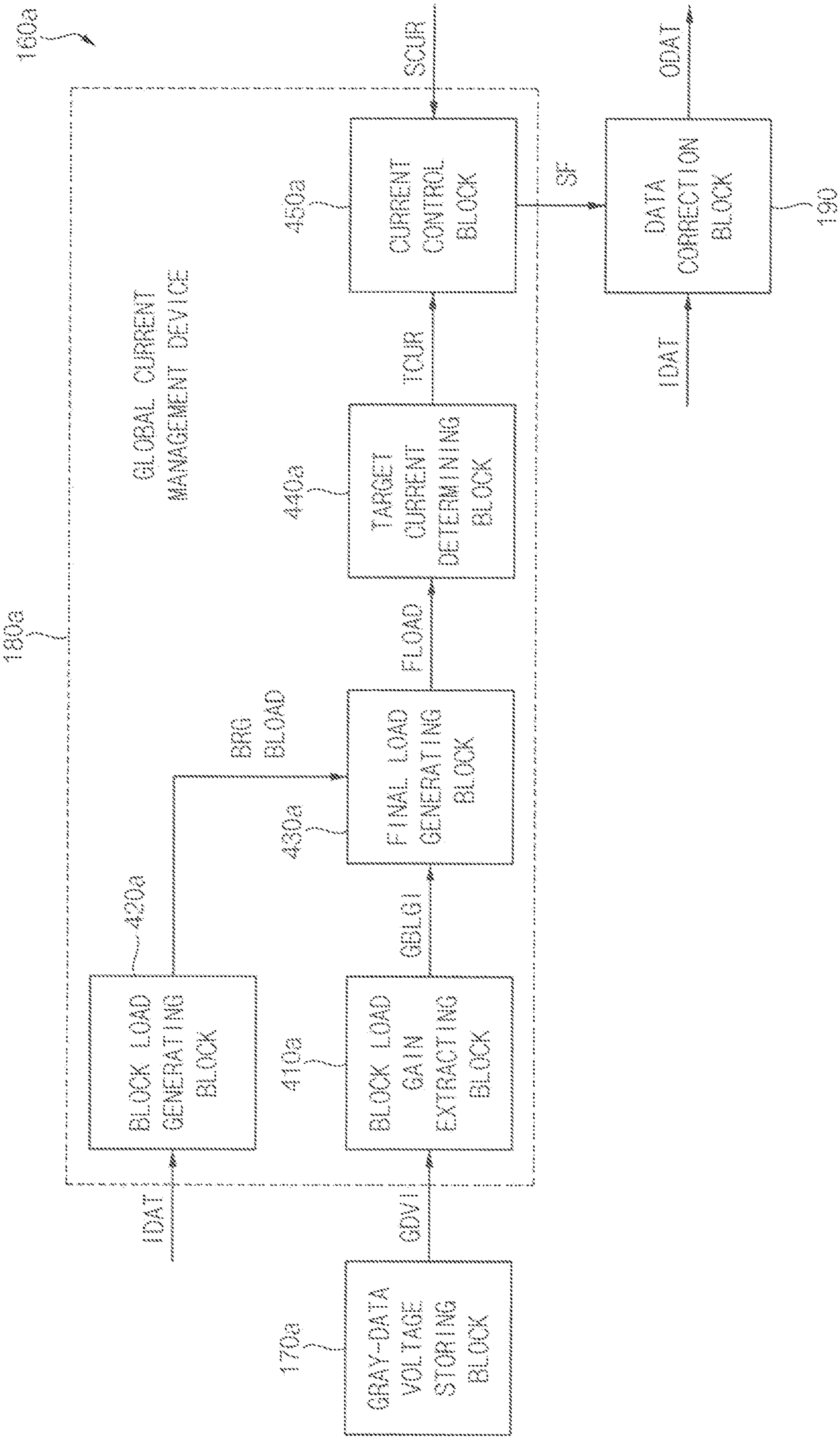
FIG. 7 is a block diagram illustrating a controller included in a display device according to embodiments.
Figure 8A:
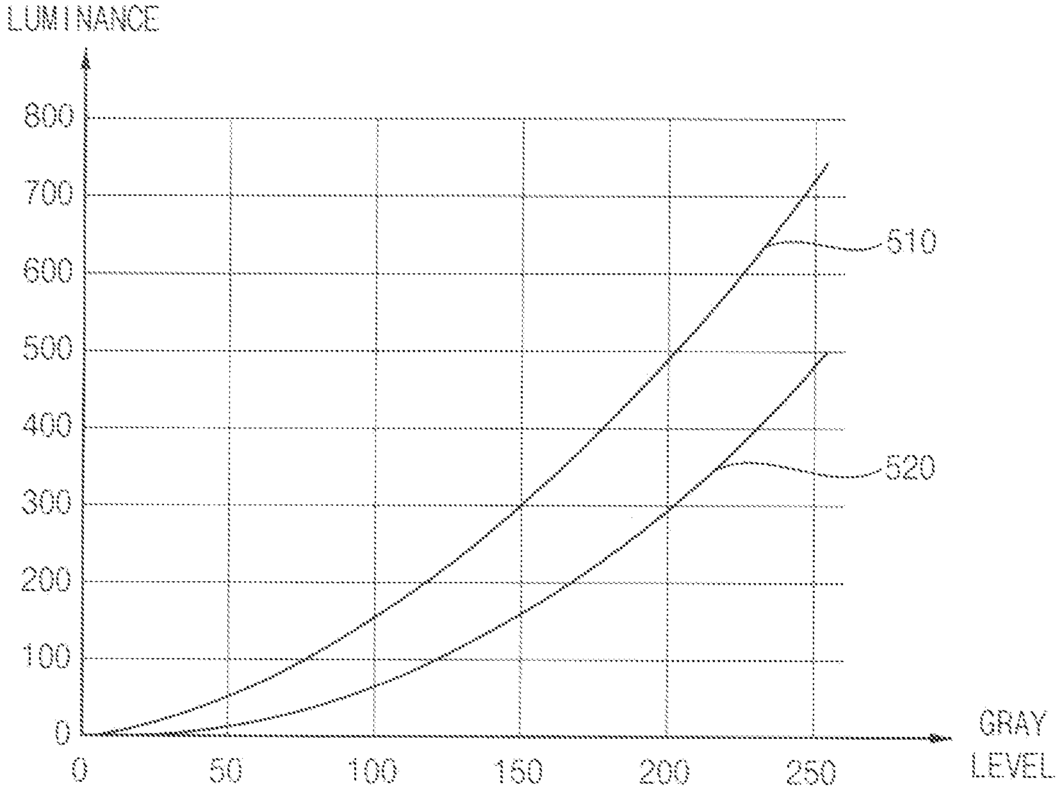
FIG. 8A is a diagram for describing an example of a luminance correction operation.
Figure 9A:
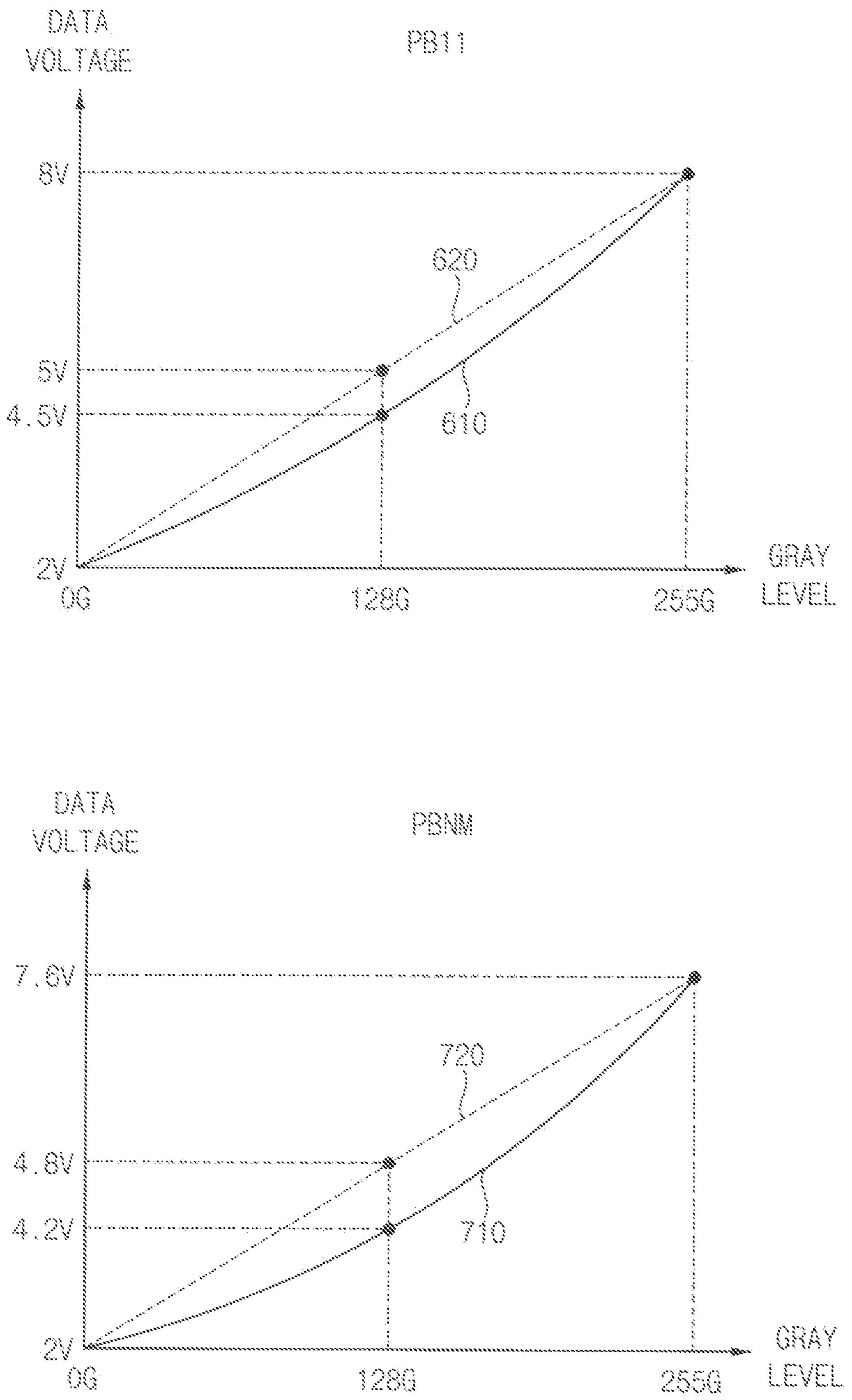
FIG. 9A is a diagram illustrating examples of actual gray-data voltage curves and reference gray-data voltage curves with respect to first and second pixel blocks.
Figures 10, 11:
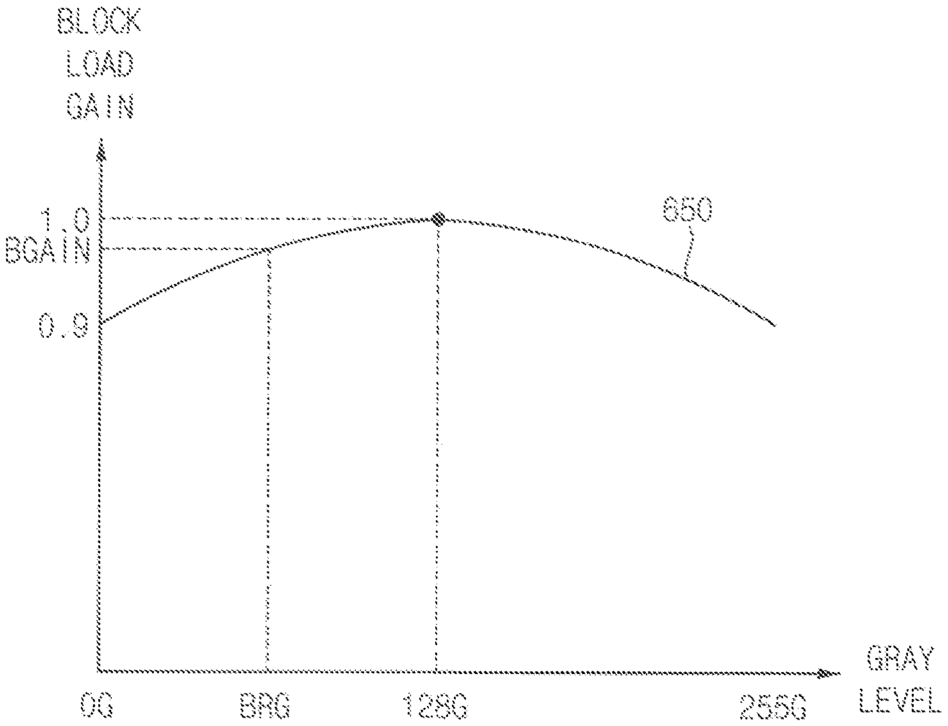
FIG. 10 is a diagram for describing an example where a block load gain is determined according to a block representative gray level with respect to each pixel block.
FIG. 11 is a diagram illustrating an example of a load-target current lookup table.

FIG. 7 is a block diagram illustrating a controller included in a display device according to embodiments, FIG. 8A is a diagram for describing an example of a luminance correction operation, FIG. 8B is a diagram for describing an example of a color correction operation, FIG. 8C is a diagram illustrating an example of gray-data voltage information for a plurality of pixel blocks, FIG. 9A is a diagram illustrating examples of actual gray-data voltage curves and reference gray-data voltage curves with respect to first and second pixel blocks, FIG. 9B is a diagram illustrating examples of gray-voltage difference curves with respect to first and second pixel blocks, FIG. 9C is a diagram illustrating examples of gray-voltage difference ratio curves with respect to first and second pixel blocks, FIG. 9D is a diagram illustrating examples of gray-block load gain curves with respect to first and second pixel blocks, FIG. 10 is a diagram for describing an example where a block load gain is determined according to a block representative gray level with respect to each pixel block, and FIG. 11 is a diagram illustrating an example of a load-target current lookup table.

Referring to FIG. 7, a controller 160*a* of a display device according to embodiments may include a gray-data voltage storing block 170*a*, a GCM device 180*a* and a data correction block 190. The GCM device 180*a* may include a block load gain extracting block 410*a*, a block load generating block 420*a*, a final load generating block 430*a*, a target current determining block 440*a* and a current control block 450*a*.

The gray-data voltage storing block 170*a* may store gray-data voltage information GDVI representing a plurality of data voltage values respectively corresponding to a plurality of gray levels for each pixel block. In some embodiments, the gray-data voltage storing block 170*a* may be a luminance and color correction (LCC) block that performs a luminance and color correction operation for the display device, and that stores the gray-data voltage information GDVI generated by the luminance and color correction operation. For example, as illustrated in FIG. 8A, the gray-data voltage storing block 170*a* may perform a luminance correction operation that adjusts a gray-luminance curve 510 which is a gray-luminance curve before correction to a gray-luminance curve 520 corresponding to a gamma curve (e.g., of 2.2). Further, as illustrated in FIG. 8B, the gray-data voltage storing block may further perform a color correction operation that adjusts a gray-x color coordinate curve 530 and a gray-y color coordinate curve 540 which is a gray-x color coordinate curve and a gray-y color coordinate curve before correction to a gray-x color coordinate line 550 and a gray-y color coordinate line 560 that have a constant color coordinate according to a gray level. The gray-data voltage storing block may perform this luminance and color correction operation on each of a plurality of pixel blocks PB11 through PBNM illustrated in FIG. 4, and may store, as illustrated in FIG. 8C, the gray-data voltage information GDVI representing a plurality of data voltage values DV1_PB11, DV2_PB11, . . . , DV255_PB11, . . . , DV1_PBNM, DV2_PBNM, DV255_PBNM determined by the luminance and color correction operation at the plurality of gray levels 1G, 2G, . . . , 255G with respect to each of the plurality of pixel blocks PB11 through PBNM. For example, the gray-data voltage information GDVI may represent a plurality of first data voltage values DV1_PB11, DV2_PB11, . . . , DV255_PB11 respectively corresponding to the plurality of gray levels 1G, 2G, . . . , 255G with respect to a first pixel block PB11, and may represent a plurality of second data voltage values DV1_PBNM, DV2_PB-NM, . . . , DV255_PBNM respectively corresponding to the plurality of gray levels 1G, 2G, . . . , 255G with respect to a second pixel block PBNM. That is, the gray-data voltage information GDVI for each pixel block may be generated by the luminance and color correction operation for the pixel block.

The block load gain extracting block 410*a* may generate gray-block load gain information GBLGI for each pixel block based on the gray-data voltage information GDVI for the pixel block. Since light emission efficiency (or a variation of the light emission efficiency) according to a gray level is reflected to the gray-data voltage information GDVI, the light emission efficiency (or the variation of the light emission efficiency) according to the gray level is also reflected to the gray-block load gain information GBLGI generated based on the gray-data voltage information GDVI.

In some embodiments, with respect to each pixel block, the block load gain extracting block 410*a* may determine a reference gray-data voltage line connecting a minimum coordinate and a maximum coordinate of an actual gray-data voltage curve represented by the gray-data voltage information GDVI. For example, as illustrated in FIG. 9A, with respect to the first pixel block PB11, the block load gain extracting block 410*a* may determine a reference gray-data voltage line 620 (or an ideal gray-data voltage line) connecting a minimum coordinate of (0G, 2V) and a maximum coordinate of (255G, 8V) in an actual gray-data voltage curve 610 represented by the gray-data voltage information GDVI. Further, with respect to the second pixel block PBNM, the block load gain extracting block 410*a* may determine a reference gray-data voltage line 720 (or an ideal gray-data voltage line) connecting a minimum coordinate of (0G, 2V) and a maximum coordinate of (255G, 7.6V) in an actual gray-data voltage curve 710 represented by the gray-data voltage information GDVI.

With respect to each pixel block, the block load gain extracting block 410*a* may generate a gray-voltage difference curve corresponding to a difference between the reference gray-data voltage line and the actual gray-data voltage curve. For example, as illustrated in FIGS. 9A and 9B, the block load gain extracting block 410*a* may generate a gray-voltage difference curve 630 corresponding to a difference between the reference gray-data voltage line 620 and the actual gray-data voltage curve 610 with respect to the first pixel block PB11, and may generate a gray-voltage difference curve 730 corresponding to a difference between the reference gray-data voltage line 720 and the actual gray-data voltage curve 710 with respect to the second pixel block PBNM. The difference between the reference gray-data voltage line 620 and 720, or the ideal gray-data voltage line 620 and 720 in an ideal case where the light emission efficiency is constant according to the gray level, and the actual gray-data voltage curve 610 and 710 where the variation of the light emission efficiency according to the gray level is considered may correspond to the variation of the light emission efficiency according to the gray level, and thus the gray-voltage difference curve 630 and 730 for each pixel block PB11 and PBNM may correspond to the variation of the light emission efficiency according to the gray level in the pixel block PB11 and PBNM.

With respect to each pixel block, the block load gain extracting block 410*a* may generate a gray-voltage difference ratio curve by dividing a voltage difference at each gray level represented by the gray-voltage difference curve by a data voltage value at the gray level represented by the reference gray-data voltage line. For example, as illustrated in FIGS. 9A through 9C, the block load gain extracting block 410*a* may generate a gray-voltage difference ratio curve 640 by dividing a voltage difference at each gray level of the gray-voltage difference curve 630 by a data voltage value at the gray level of the reference gray-data voltage line 620 with respect to the first pixel block PB11, and may generate a gray-voltage difference ratio curve 740 by dividing a voltage difference at each gray level of the gray-voltage difference curve 730 by a data voltage value at the gray level of the reference gray-data voltage line 720 with respect to the second pixel block PBNM.

With respect to each pixel block, the block load gain extracting block 410*a* may generate the gray-block load gain information GBLGI representing a plurality of block load gains respectively corresponding to the plurality of gray levels by normalizing the gray-voltage difference ratio curve. For example, as illustrated in FIGS. 9C and 9D, the block load gain extracting block 410*a* may generate the gray-block load gain information GBLGI representing a gray-block load gain curve 650 by normalizing the gray-voltage difference ratio curve 640 with respect to the first pixel block PB11 such that a maximum ratio value of the gray-voltage difference ratio curve 640 becomes a maximum block load gain of 1 and a minimum ratio value of the gray-voltage difference ratio curve 640 becomes a minimum block load gain of "1−the maximum ratio value", or 0.9, and may generate the gray-block load gain information GBLGI representing a gray-block load gain curve 750 by normalizing the gray-voltage difference ratio curve 740 with respect to the second pixel block PBNM such that a maximum ratio value of the gray-voltage difference ratio curve 740 becomes a maximum block load gain of 1 and a minimum ratio value of the gray-voltage difference ratio curve 640 becomes a minimum block load gain of "1−the maximum ratio value", or 0.875. Since the gray-block load gain curve 650 and 750, or the gray-block load gain information GBLGI for each pixel block PB11 and PBNM is generated based on the gray-voltage difference curve 630 and 730 corresponding to the variation of the light emission efficiency according to the gray level in the pixel block PB11 and PBNM, the variation of the light emission efficiency according to the gray level in each pixel block PB11 and PBNM is also reflected to the gray-block load gain information GBLGI for the pixel block PB11 and PBNM.

The block load generating block 420*a* may generate a block representative gray level BRG and a block load BLOAD for each of the plurality of pixel blocks by analyzing input image data IDAT. In some embodiments, the block load generating block 420*a* may generate the block representative gray level BRG for each pixel block by generating an average of gray levels represented by the input image data IDAT with respect to the pixel block. In other embodiments, with respect to each pixel block, the block load generating block 420*a* may determine a minimum gray level or a maximum gray level of the gray levels represented by the input image data IDAT as the block representative gray level BRG. Further, in some embodiments, the block load generating block 420*a* may generate a sum value of the gray levels represented by the input image data IDAT with respect to each pixel block, and may divide the sum value of the gray levels by a maximum sum value (corresponding to a sum of maximum (e.g., 255) gray levels) to generate the block load BLOAD for the pixel block. In other embodiments, with respect to each pixel block, the block load generating block 420*a* may determine the block load BLOAD based on the minimum gray level or the maximum gray level of the gray levels represented by the input image data IDAT.

The final load generating block 430*a* may determine a block load gain for each pixel block based on the gray-block load gain information GBLGI and the block representative gray level BRG for the pixel block. For example, as illustrated in FIG. 10, with respect to each pixel block (e.g., the first pixel block PB11), the final load generating block 430*a* may determine the block load gain BGAIN corresponding to the block representative gray level BRG (e.g., an average gray level, a minimum gray level or a maximum gray level of the input image data IDAT for the first pixel block PB11) determined by the block load generating block 420*a* in the gray-block load gain curve 650 represented by the gray-block load gain information GBLGI. The light emission efficiency (or the variation of the light emission efficiency) according to the gray level in each pixel block may be reflected to the block load gain BGAIN of the pixel block. For example, the block load gain BGAIN may be relatively high at a first gray level at which the light emission efficiency is relatively high, and may be relatively low at a second gray level at which the light emission efficiency is relatively low.

Further, the final load generating block 430*a* may generate a final load FLOAD for a display panel based on the block loads BLOAD and the block load gains BGAIN of the plurality of pixel blocks. In some embodiments, the final load generating block 430*a* may generate a final block load for each pixel block by multiplying the block load BLOAD and the block load gain BGAIN with respect to the pixel block, and may generate the final load FLOAD for the display panel by generating an average of the final block loads of the plurality of pixel blocks. In other embodiments, the final load generating block 430*a* may determine a minimum value or a maximum value of the final block loads of the plurality of pixel blocks as the final load FLOAD.

The target current determining block 440*a* may determine a target current value TCUR corresponding to the final load FLOAD. In some embodiments, as illustrated in FIG. 11, the target current determining block 440*a* may include a load-target current lookup table that stores a plurality of target current values TCUR0, TCUR1, . . . , TCUR100 respectively corresponding to a plurality of load values 0%, 1%, . . . , 100%. Although FIG. 11 illustrates an example of the load-target current lookup table that stores the plurality of target current values TCUR0, TCUR1, . . . , TCUR100 at the plurality of load values having an interval of about 1% in a range from about 0% to about 100%, the range and the interval of the load values are not limited to the example of FIG. 11. The target current determining block 440*a* may determine the target current value TCUR corresponding to the final load FLOAD by using the load-target current lookup table.

The current control block 450*a* may receive a sensing current value SCUR from a current sensor 150 illustrated in FIG. 1, and may determine a scale factor SF by comparing the sensing current value SCUR with the target current value TCUR. In some embodiments, the current control block 450*a* may generate the scale factor SF greater than 1 when the sensing current value SCUR is less than the target current value TCUR, and may generate the scale factor SF less than 1 when the sensing current value SCUR is greater than the target current value TCUR.

The data correction block 190 may generate output image data ODAT by applying the scale factor SF to the input image data IDAT. In some embodiments, the data correction block 190 may generate the output image data ODAT by multiplying the input image data IDAT by the scale factor SF.

As described above, since the final load FLOAD is determined by considering the block load gain BGAIN to which the light emission efficiency according to the gray level at each pixel or at each pixel block is reflected, the display panel driven based on the output image data ODAT where the scale factor SF corresponding to the final load FLOAD is applied may emit light with desired luminance.

Figure 12:
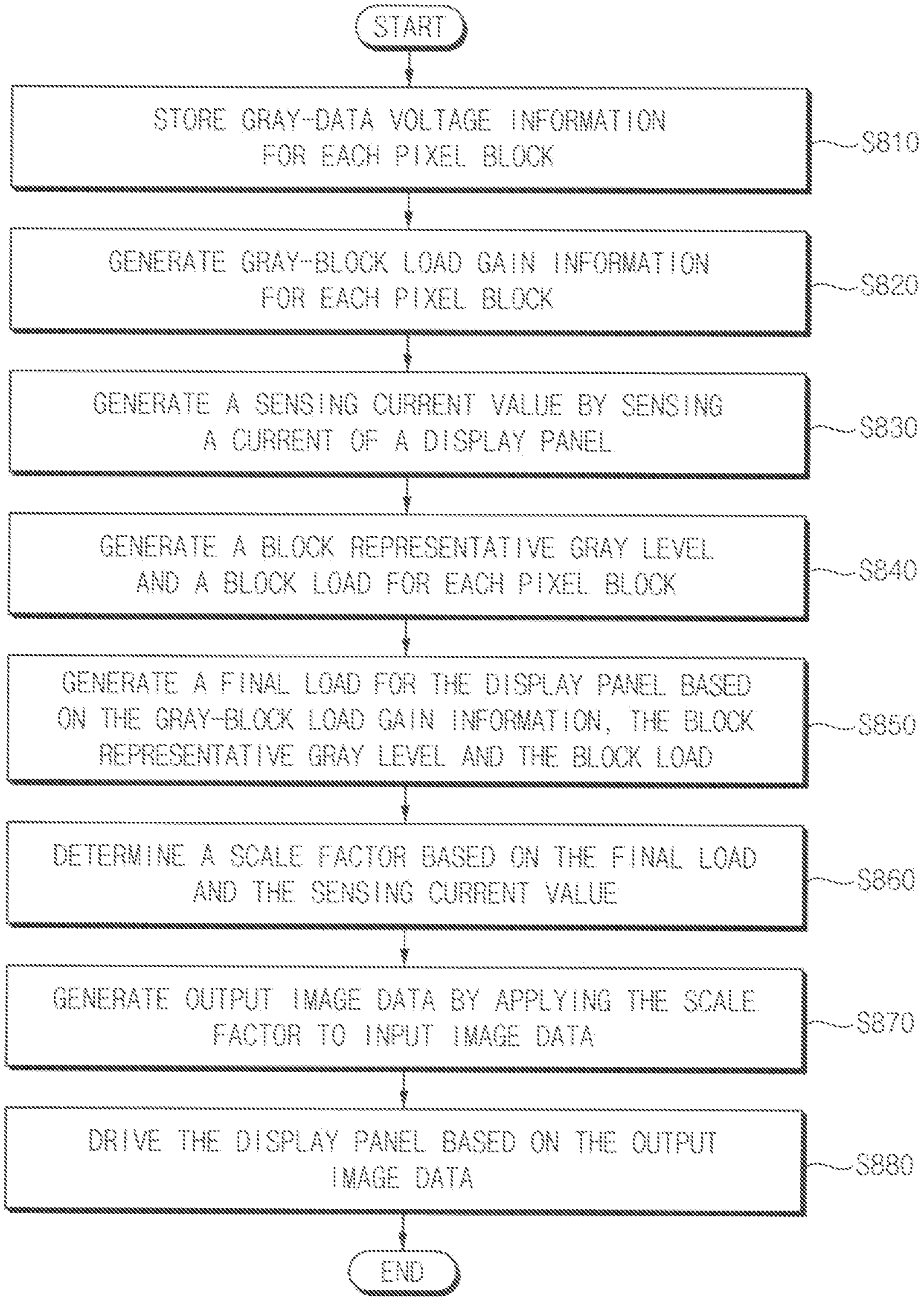
FIG. 12 is a flowchart illustrating a method of operating a display device according to embodiments.

FIG. 12 is a flowchart illustrating a method of operating a display device according to embodiments.

Referring to FIGS. 7 and 12, in a method of operating a display device according to embodiments, a gray-data voltage storing block 170*a* may store gray-data voltage information GDVI for each of a plurality of pixel blocks of a display panel of the display device (S810). The gray-data voltage information GDVI may represent a plurality of data voltage values respectively corresponding to a plurality of gray levels with respect to each of the plurality of pixel blocks. In some embodiments, the gray-data voltage information GDVI may be generated by a luminance and color correction operation for the display device.

A block load gain extracting block 410*a* may generate gray-block load gain information GBLGI for each of the plurality of pixel blocks based on the gray-data voltage information GDVI (S820). The gray-block load gain information GBLGI may represent a plurality of block load gains respectively corresponding to the plurality of gray levels with respect to each of the plurality of pixel blocks. In some embodiments, with respect to each pixel block, the block load gain extracting block 410*a* may determine a reference gray-data voltage line (or an ideal gray-data voltage line) connecting a minimum coordinate and a maximum coordinate of an actual gray-data voltage curve represented by the gray-data voltage information GDVI, may generate a gray-voltage difference curve corresponding to a difference between the reference gray-data voltage line and the actual gray-data voltage curve, may generate a gray-voltage difference ratio curve by dividing a voltage difference at each gray level represented by the gray-voltage difference curve by a data voltage value at the gray level represented by the reference gray-data voltage line, and may generate the gray-block load gain information GBLGI representing a plurality of block load gains respectively corresponding to a plurality of gray levels by normalizing the gray-voltage difference ratio curve.

A current sensor 150 illustrated in FIG. 1 may generate a sensing current value SCUR by sensing a current flowing through the display panel (S830). In some embodiments, as illustrated in FIG. 1, the current sensor 150 may sense a current provided to the display panel 110 through a power supply line for supplying a first power supply voltage ELVDD.

A block load generating block 420*a* may generate a block representative gray level BRG and a block load BLOAD for each of the plurality of pixel blocks by analyzing input image data IDAT (S840). In some embodiments, with respect to each of the plurality of pixel blocks, the block load generating block 420*a* may generate the block representative gray level BRG by generating an average of gray levels represented by the input image data IDAT.

Further, with respect to each of the plurality of pixel blocks, the block load generating block 420*a* may generate the block load BLOAD by dividing a sum value of the gray levels represented by the input image data by a maximum sum value.

A final load generating block 430*a* may generate a final load FLOAD for the display panel based on the gray-block load gain information GBLGI, the block representative gray level BRG and the block load BLOAD for each of the plurality of pixel blocks (S850). In some embodiments, the final load generating block 430*a* may determine a block load gain corresponding to the block representative gray level BRG by using the gray-block load gain information GBLGI representing a plurality of block load gains respectively corresponding to the plurality of gray levels with respect to each of the plurality of pixel blocks, may generate a final block load by multiplying the block load BLOAD and the block load gain with respect to each of the plurality of pixel blocks, and may generate the final load FLOAD for the display panel by generating an average of the final block loads of the plurality of pixel blocks.

A target current determining block 440*a* and a current control block 450*a* may determine a scale factor SF based on the final load FLOAD and the sensing current value SCUR (S860). In some embodiments, the target current determining block 440*a* may determine a target current value TCUR corresponding to the final load FLOAD by using a load-target current lookup table that stores a plurality of target current values respectively corresponding to a plurality of load values, and the current control block 450*a* may determine the scale factor SF by comparing the sensing current value SCUR with the target current value TCUR.

A data correction block 190 may generate output image data ODAT by applying the scale factor SF to the input image data IDAT (S870). In some embodiments, the data correction block 190 may generate the output image data ODAT by multiplying the input image data IDAT by the scale factor SF. The display panel may be driven based on the output image data ODAT (S880).

Figure 13:
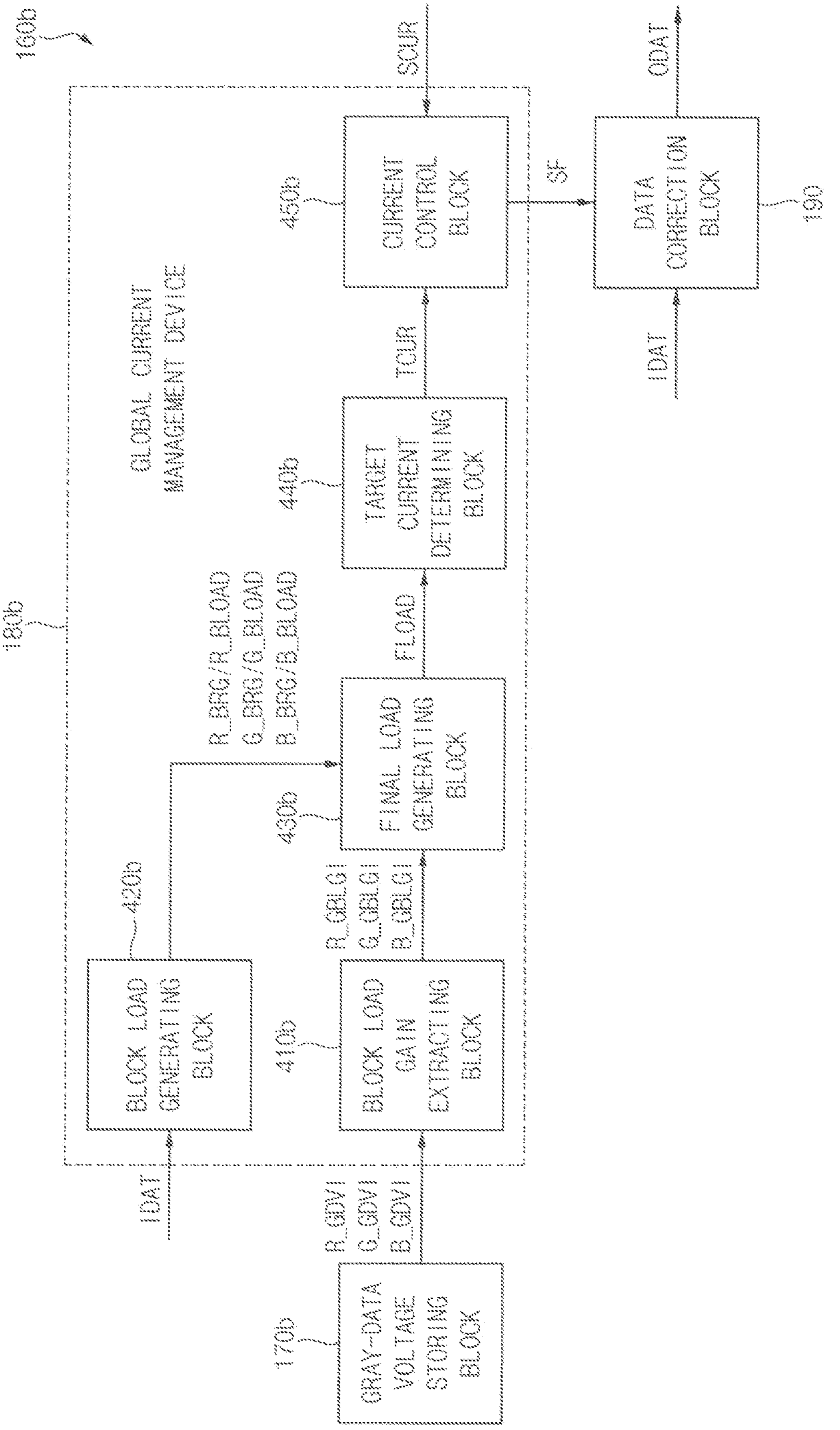
FIG. 13 is a block diagram illustrating a controller included in a display device according to embodiments.

FIG. 13 is a block diagram illustrating a controller included in a display device according to embodiments, and FIG. 14 is a diagram illustrating an example of red, green and blue gray-data voltage information for a plurality of pixel blocks.

Referring to FIG. 13, a controller 160*b* of a display device according to embodiments may include a gray-data voltage storing block 170*b*, a GCM device 180*b* and a data correction block 190. The GCM device 180*b* may include a block load gain extracting block 410*b*, a block load generating block 420*b*, a final load generating block 430*b*, a target current determining block 440*b* and a current control block 450*b*. The controller 160*b* of FIG. 13 may have a similar configuration and a similar operation to a controller 160*a* of FIG. 7, except that the GCM device 180*b* may determine a final load FLOAD by using first, second and third color gray-data voltage information (e.g., red, green and blue gray-data voltage information R_GDVI G_GDVI and B_GDVI) for a first sub-pixel (e.g., a red sub-pixel) emitting first color light (e.g., red light), a second sub-pixel (e.g., a green sub-pixel) emitting second color light (e.g., green light) and a third sub-pixel (e.g., a blue sub-pixel) emitting third color light (e.g., blue light) with respect to each pixel block.

Each pixel of the display device may include the first, second and third sub-pixels, for example the red, green and blue sub-pixels, and the gray-data voltage storing block 170*b* may store red, green and blue gray-data voltage information R_GDVI, G_GDVI and B_GDVI for the red, green and blue sub-pixels with respect to each pixel block.

For example, as illustrated in FIG. 14, with respect to each of a plurality of pixel blocks PB11, . . . , PBNM, the gray-data voltage storing block 170*b* may store the red gray-data voltage information R_GDVI representing a plurality of data voltage values R_DV1_PB11, R_DV2_PB11, R_DV255_PB11, . . . , R_DV1_PBNM, R_DV2_PBNM, . . . , R_DV255_PBNM for the red sub-pixel respectively corresponding to a plurality of gray levels 1G, 2G, . . . , 255G, the green gray-data voltage information G_GDVI representing a plurality of data voltage values G_DV1_PB11, G_DV2_PB11, . . . , G_DV255_PB11, . . . , G_DV1_PBNM, G_DV2_PBNM, . . . , G_DV255_PBNM for the green sub-pixel respectively corresponding to the plurality of gray levels 1G, 2G, . . . , 255G, and the blue gray-data voltage information G_GDVI representing a plurality of data voltage values B_DV1_PB11, B_DV2_PB11, . . . , B_DV255_PB11, . . . , B_DV1_PBNM, B_DV2_PBNM, . . . , B_DV255_PBNM for the blue sub-pixel respectively corresponding to the plurality of gray levels 1G, 2G, . . . , 255G.

With respect to each of the plurality of pixel blocks, the block load gain extracting block 410*b* may generate first, second and third color gray-block load gain information, for example red, green and blue gray-block load gain information R_GBLGI, G_GBLGI and B_GBLGI based on the red, green and blue gray-data voltage information R_GDVI, G_GDVI and B_GDVI.

The block load generating block 420*b* may generate first, second and third color block representative gray levels, for example red, green and blue block representative gray levels R_BRG, G_BRG and B_BRG and first, second and third color block loads, for example red, green and blue block loads R_BLOAD, G_BLOAD and B_BLOAD for each of the plurality of pixel blocks by analyzing input image data IDAT. In some embodiments, the block load generating block 420*b* may generate the red block representative gray level R_BRG for each pixel block by generating an average of gray levels represented by the input image data IDAT with respect to red sub-pixels of the pixel block, may generate the green block representative gray level G_BRG for each pixel block by generating an average of gray levels represented by the input image data IDAT with respect to green sub-pixels of the pixel block, and may generate the blue block representative gray level B_BRG for each pixel block by generating an average of gray levels represented by the input image data IDAT with respect to blue sub-pixels of the pixel block. In other embodiments, with respect to each pixel block, the block load generating block 420*b* may determine a minimum gray level or a maximum gray level of the gray levels represented by the input image data IDAT with respect to the red sub-pixels of the pixel block as the red block representative gray level R_BRG, may determine a minimum gray level or a maximum gray level of the gray levels represented by the input image data IDAT with respect to the green sub-pixels of the pixel block as the green block representative gray level G_BRG, and may determine a minimum gray level or a maximum gray level of the gray levels represented by the input image data IDAT with respect to the blue sub-pixels of the pixel block as the blue block representative gray level B_BRG. Further, in some embodiments, with respect to each pixel block, the block load generating block 420*b* may generate a first sum value of the gray levels represented by the input image data IDAT with respect to the red sub-pixels of the pixel block, may generate a second sum value of the gray levels represented by the input image data IDAT with respect to the green sub-pixels of the pixel block, may generate a third sum value of the gray levels represented by the input image data IDAT with respect to the blue sub-pixels of the pixel block, may generate the red block load R_BLOAD by dividing the first sum value by a maximum sum value of the red sub-pixels of the pixel block, may generate the green block load G_BLOAD by dividing the second sum value by the maximum sum value of the green sub-pixels of the pixel block, and may generate the blue block load B_BLOAD by dividing the third sum value by the maximum sum value of the blue sub-pixels of the pixel block. In other embodiments, with respect to each pixel block, the block load generating block 420*b* may determine the red block load R_BLOAD based on a minimum gray level or a maximum gray level of the gray levels represented by the input image data IDAT with respect to the red sub-pixels of the pixel block, may determine the green block load G_BLOAD based on a minimum gray level or a maximum gray level of the gray levels represented by the input image data IDAT with respect to the green sub-pixels of the pixel block, and may determine the blue block load B_BLOAD based on a minimum gray level or a maximum gray level of the gray levels represented by the input image data IDAT with respect to the blue sub-pixels of the pixel block.

With respect to each pixel block, the final load generating block 430*b* may determine first, second and third color block load gains, for example red, green and blue block load gains based on the red, green and blue gray-block load gain information R_GLBGI, G_GLBGI and B_GLBGI and the red, green and blue block representative gray levels R_BRG, G_BRG and B_BRG. Further, the final load generating block 430*b* may generate the final load FLOAD for a display panel based on the red, green and blue block loads R_BLOAD, G_BLOAD and B_BLOAD and the red, green and blue block load gains of the plurality of pixel blocks.

The target current determining block 440*b* may determine a target current value TCUR corresponding to the final load FLOAD. The current control block 450*a* may receive a sensing current value SCUR from a current sensor and a target current value TCUR from the target current determining block 440*a*, and may determine a scale factor SF by comparing the sensing current value SCUR with the target current value TCUR. The data correction block 190 may generate output image data ODAT by applying the scale factor SF to the input image data IDAT. The final load FLOAD may be determined by considering light emission efficiency of red, green and blue light emitting elements according to a position (or a pixel block) and a gray level, and the display panel driven based on the output image data ODAT may emit light with desired luminance.

Figure 15:
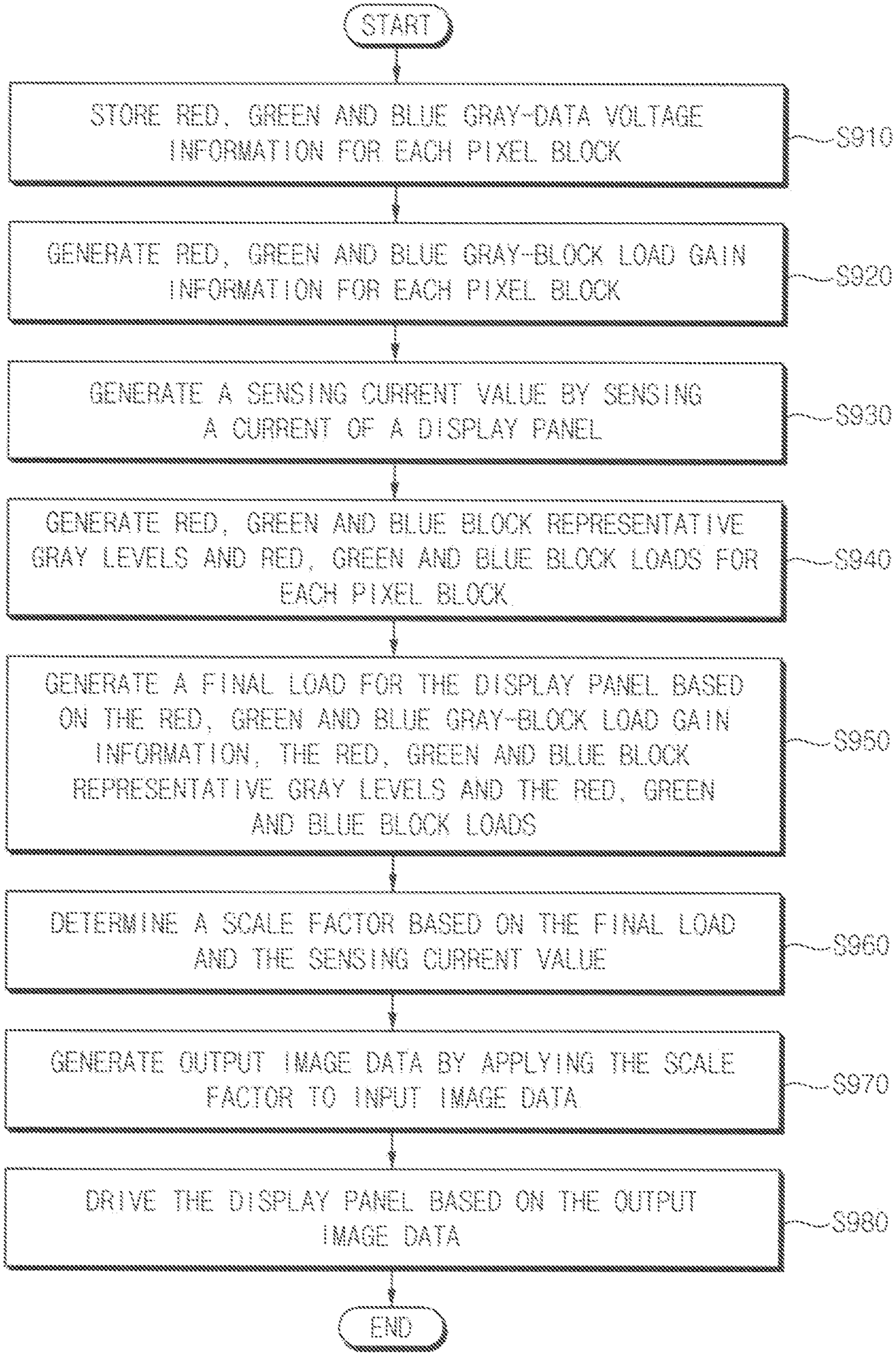
FIG. 15 is a flowchart illustrating a method of operating a display device according to embodiments.

FIG. 15 is a flowchart illustrating a method of operating a display device according to embodiments.

Referring to FIGS. 13 and 15, in a method of operating a display device according to embodiments, a gray-data voltage storing block 170*b* may store red, green and blue gray-data voltage information R_GDVI, G_GDVI and B_GDVI for red, green and blue sub-pixels with respect to each of a plurality of pixel blocks (S910).

With respect to each pixel block, a block load gain extracting block 410*b* may generate red, green and blue gray-block load gain information R_GBLGI, G_GBLGI and B_GBLGI based on the red, green and blue gray-data voltage information R_GDVI, G_GDVI and B_GDVI (S920).

A current sensor 150 illustrated in FIG. 1 may generate a sensing current value SCUR by sensing a current flowing through a display panel (S930).

With respect to each pixel block, a block load generating block 420*b* may generate red, green and blue block representative gray levels R_BRG, G_BRG and B_BRG and red, green and blue block loads R_BLOAD, G_BLOAD and B_BLOAD by analyzing input image data IDAT (S940).

A final load generating block 430*b* may generate a final load FLOAD for the display panel based on the red, green and blue gray-block load gain information R_GBLGI, G_GBLGI and B_GBLGI, the red, green and blue block representative gray levels R_BRG, G_BRG and B_BRG and the red, green and blue block loads R_BLOAD, G_BLOAD and B_BLOAD (S950).

A target current determining block 440*b* and a current control block 450*b* may determine a scale factor SF based on the final load FLOAD and the sensing current value SCUR (S960). A data correction block 190 may generate output image data ODAT by applying the scale factor SF to the input image data IDAT (S970). The display panel may be driven based on the output image data ODAT (S980).

Figure 16:
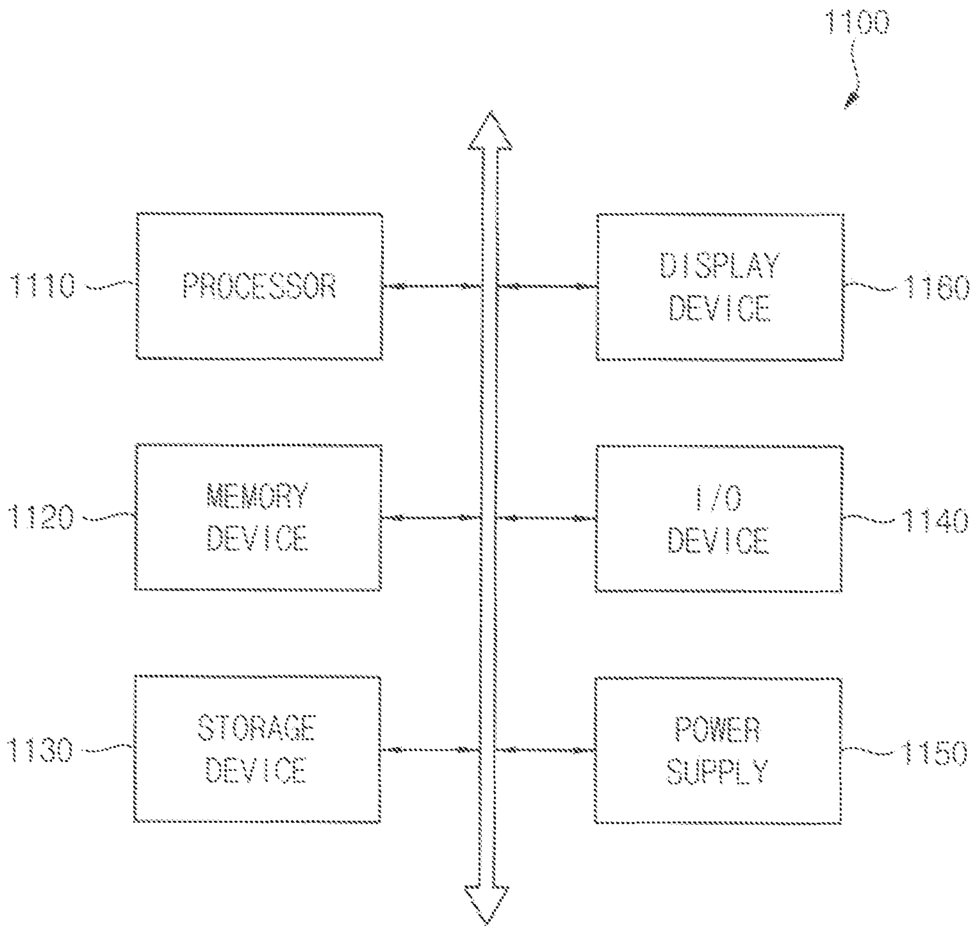
FIG. 16 is a block diagram illustrating an electronic device including a display device according to embodiments.

FIG. 16 is a block diagram illustrating an electronic device including a display device according to embodiments.

Referring to FIG. 16, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, gray-data voltage information for each of a plurality of pixel blocks may be stored, gray-block load gain information for each of the plurality of pixel blocks may be generated based on the gray-data voltage information, and a final load for a display panel may be determined by using the gray-block load gain information for each of the plurality of pixel blocks. Accordingly, light emission efficiency according to each pixel block (or each position) and each gray level may be considered in determining the final load, and thus the display panel may emit light with desired luminance while a current of the display panel may be controlled to reduce power consumption.

The inventive concepts may be applied any electronic device 1100 including the display device 1160. For example, the inventive concepts may be applied to a mobile phone, a smart phone, a tablet computer, a virtual reality (VR) device, a television (TV), a digital TV, a 3D TV, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including a plurality of pixels, the plurality of pixels including a plurality of pixel blocks;

a power management circuit configured to provide a power supply voltage to the display panel;

a current sensor connected to the display panel, and configured to generate a sensing current value by sensing a current of the display panel;

a controller configured to receive the sensing current value from the current sensor to store gray-data voltage information for each of the plurality of pixel blocks, to generate gray-block load gain information for each of the plurality of pixel blocks based on the gray-data voltage information, to generate a block representative gray level and a block load for each of the plurality of pixel blocks by analyzing input image data, to generate a final load for the display panel based on the gray-block load gain information, the block representative gray level and the block load, to determine a scale factor based on the final load and the sensing current value, and to generate output image data by applying the scale factor to the input image data; and a data driver providing data voltages to the plurality of pixels based on the output image data.

2. The display device of claim 1, wherein the gray-data voltage information represents a plurality of data voltage values respectively corresponding to a plurality of gray levels with respect to each of the plurality of pixel blocks, and wherein the gray-block load gain information represents a plurality of block load gains respectively corresponding to the plurality of gray levels with respect to each of the plurality of pixel blocks.

3. The display device of claim 1, wherein the gray-data voltage information is generated by a luminance and color correction operation for the display device.

4. The display device of claim 1, wherein the controller includes:

a gray-data voltage storing block configured to store the gray-data voltage information for each of the plurality of pixel blocks;

a block load gain extracting block configured to generate the gray-block load gain information for each of the plurality of pixel blocks based on the gray-data voltage information;

a block load generating block configured to generate the block representative gray level and the block load for each of the plurality of pixel blocks by analyzing the input image data;

a final load generating block configured to generate the final load for the display panel based on the gray-block load gain information, the block representative gray level and the block load;

a current control block configured to determine the scale factor based on the final load and the sensing current value; and a data correction block configured to generate the output image data by applying the scale factor to the input image data.

5. The display device of claim 4, wherein the controller further includes:

a target current determining block configured to determine a target current value corresponding to the final load, wherein the block load gain extracting block is connected to the gray-data voltage storing block;

the block load generating block receives the input image data;

the final load generating block is connected to the block load gain extracting block and the block load generating block, and determines a block load gain for each of the plurality of pixel blocks based on the gray-block load gain information and the block representative gray level for each of the plurality of pixel blocks, and generates the final load for the display panel based on the block loads and the block load gains of the plurality of pixel blocks;

the target current determining block is connected to the final load generating block;

the current control block is connected to the current sensor and the target current determining block, and receives the sensing current value from the current sensor, and determines the scale factor by comparing the sensing current value with the target current value; and the data correction block is connected to the current control block.

6. The display device of claim 5, wherein, with respect to the each of the plurality of pixel blocks, the block load gain extracting block determines a reference gray-data voltage line connecting a minimum coordinate and a maximum coordinate of an actual gray-data voltage curve represented by the gray-data voltage information, generates a gray-voltage difference curve corresponding to a difference between the reference gray-data voltage line and the actual gray-data voltage curve, generates a gray-voltage difference ratio curve by dividing a voltage difference at each gray level represented by the gray-voltage difference curve by a data voltage value at each gray level represented by the reference gray-data voltage line, and generates the gray-block load gain information representing a plurality of block load gains respectively corresponding to a plurality of gray levels by normalizing the gray-voltage difference ratio curve.

7. The display device of claim 5, wherein, with respect to the each of the plurality of pixel blocks, the block load generating block generates an average of gray levels represented by the input image data as the block representative gray level, and generates the block load by dividing a sum value of the gray levels represented by the input image data by a maximum sum value.

8. The display device of claim 5, wherein the final load generating block determines the block load gain corresponding to the block representative gray level by using the gray-block load gain information representing a plurality of block load gains respectively corresponding to a plurality of gray levels with respect to the each of the plurality of pixel blocks, generating a final block load by multiplying the block load and the block load gain with respect to the each of the plurality of pixel blocks, and generating an average of the final block loads of the plurality of pixel blocks as the final load for the display panel.

9. The display device of claim 5, wherein the target current determining block includes:

a load-target current lookup table configured to store a plurality of target current values respectively corresponding to a plurality of load values, and wherein the target current determining block determines the target current value corresponding to the final load by using the load-target current lookup table.

10. The display device of claim 5, wherein the current control block generates the scale factor greater than 1 when the sensing current value is less than the target current value, and generates the scale factor less than 1 when the sensing current value is greater than the target current value.

11. The display device of claim 5, wherein the data correction block generates the output image data by multiplying the input image data by the scale factor.

12. The display device of claim 1, wherein each of the plurality of pixels includes a first sub-pixel emitting first color light, a second sub-pixel emitting second color light, and a third sub-pixel emitting third color light, and wherein the controller is further configured to:

store, as the gray-data voltage information, first, second and third color gray-data voltage information for the first, second and third sub-pixels with respect to the each of the plurality of pixel blocks;

generate, as the gray-block load gain information, first, second and third color gray-block load gain information based on the first, second and third color gray-data voltage information with respect to the each of the plurality of pixel blocks;

generate first, second and third color block representative gray levels and first, second and third color block loads by analyzing the input image data with respect to the each of the plurality of pixel blocks; and generate the final load for the display panel based on the first, second and third color gray-block load gain information, the first, second and third color block representative gray levels and the first, second and third color block loads.

13. The display device of claim 12, wherein the controller includes:

a gray-data voltage storing block configured to store the first, second and third color gray-data voltage information for the each of the plurality of pixel blocks;

a block load gain extracting block configured to generate the first, second and third color gray-block load gain information for the each of the plurality of pixel blocks based on the first, second and third color gray-data voltage information;

a block load generating block configured to generate the first, second and third color block representative gray levels and the first, second and third color block loads for the each of the plurality of pixel blocks by analyzing the input image data;

a final load generating block configured to determine first, second and third color block load gains for the each of the plurality of pixel blocks based on the first, second and third color gray-block load gain information and the first, second and third color block representative gray levels for the each of the plurality of pixel blocks, and to generate the final load for the display panel based on the first, second and third color block loads and the first, second and third color block load gains of the plurality of pixel blocks;

a target current determining block configured to determine a target current value corresponding to the final load;

a current control block configured to receive the sensing current value from the current sensor, and to determine the scale factor by comparing the sensing current value with the target current value; and a data correction block configured to generate the output image data by applying the scale factor to the input image data.

14. A display device comprising:

a display panel including a plurality of pixels, the plurality of pixels including a plurality of pixel blocks;

a power management circuit configured to provide a power supply voltage to the display panel;

a current sensor connected to the display panel, and configured to generate a sensing current value by sensing a current of the display panel;

a controller configured to receive the sensing current value from the current sensor, the controller including:

a gray-data voltage storing block storing gray-data voltage information for each of the plurality of pixel blocks, a block load gain extracting block generating gray-block load gain information for each of the plurality of pixel blocks based on the gray-data voltage information, a block load generating block generating a block representative gray level and a block load for each of the plurality of pixel blocks by analyzing input image data, a final load generating block generating a final load for the display panel based on the gray-block load gain information, the block representative gray level and the block load, a current control block determining a scale factor based on the final load and the sensing current value, and a data correction block generating output image data by applying the scale factor to the input image data; and a data driver providing data voltages to the plurality of pixels based on the output image data.

15. The display device of claim 14, wherein the gray-data voltage information represents a plurality of data voltage values respectively corresponding to a plurality of gray levels with respect to each of the plurality of pixel blocks, and wherein the gray-block load gain information represents a plurality of block load gains respectively corresponding to the plurality of gray levels with respect to each of the plurality of pixel blocks.

16. The display device of claim 14, wherein the gray-data voltage information is generated by a luminance and color correction operation for the display device.

17. The display device of claim 14, wherein the controller further includes a target current determining block determining a target current value corresponding to the final load, and wherein the block load gain extracting block is connected to the gray-data voltage storing block;

the block load generating block receives the input image data;

the final load generating block is connected to the block load gain extracting block and the block load generating block, and determines a block load gain for each of the plurality of pixel blocks based on the gray-block load gain information and the block representative gray level for each of the plurality of pixel blocks, and generates the final load for the display panel based on the block loads and the block load gains of the plurality of pixel blocks;

the target current determining block is connected to the final load generating block;

the current control block is connected to the current sensor and the target current determining block, and receives the sensing current value from the current sensor, and determines the scale factor by comparing the sensing current value with the target current value; and the data correction block is connected to the current control block.

18. The display device of claim 17, wherein, with respect to the each of the plurality of pixel blocks, the block load gain extracting block determines a reference gray-data voltage line connecting a minimum coordinate and a maximum coordinate of an actual gray-data voltage curve represented by the gray-data voltage information, generates a gray-voltage difference curve corresponding to a difference between the reference gray-data voltage line and the actual gray-data voltage curve, generates a gray-voltage difference ratio curve by dividing a voltage difference at each gray level represented by the gray-voltage difference curve by a data voltage value at each gray level represented by the reference gray-data voltage line, and generates the gray-block load gain information representing a plurality of block load gains respectively corresponding to a plurality of gray levels by normalizing the gray-voltage difference ratio curve.

19. The display device of claim 14, wherein each of the plurality of pixels includes a first sub-pixel emitting first color light, a second sub-pixel emitting second color light, and a third sub-pixel emitting third color light, and wherein the controller is further configured to:

store, as the gray-data voltage information, first, second and third color gray-data voltage information for the first, second and third sub-pixels with respect to the each of the plurality of pixel blocks;

generate, as the gray-block load gain information, first, second and third color gray-block load gain information based on the first, second and third color gray-data voltage information with respect to the each of the plurality of pixel blocks;

generate first, second and third color block representative gray levels and first, second and third color block loads by analyzing the input image data with respect to the each of the plurality of pixel blocks; and generate the final load for the display panel based on the first, second and third color gray-block load gain information, the first, second and third color block representative gray levels and the first, second and third color block loads.

20. The display device of claim 19, wherein the controller further includes a target current determining block determining a target current value corresponding to the final load, and wherein the block load gain extracting block is connected to the gray data voltage storing block and the gray-block load gain information includes the first, second and third color gray-block load gain information for the each of the plurality of pixel blocks based on the first, second and third color gray-data voltage information;

the block load generating block receives the input image data and generates the first, second and third color block representative gray levels and the first, second and third color block loads for the each of the plurality of pixel blocks by analyzing the input image data;

the final load generating block is connected to the block load gain extracting block and the block load generating block, and determines first, second and third color block load gains for the each of the plurality of pixel blocks based on the first, second and third color gray-block load gain information and the first, second and third color block representative gray levels for the each of the plurality of pixel blocks, and generates the final load for the display panel based on the first, second and third color block loads and the first, second and third color block load gains of the plurality of pixel blocks;

the target current determining block is connected to the final load generating block;

the current control block is connected to the current sensor and the target current determining block, and receives the sensing current value from the current sensor, and determines the scale factor by comparing the sensing current value with the target current value; and the data correction block is connected to the current control block.

* * * * *